(12) United States Patent
Ichiki

(10) Patent No.: US 9,312,048 B2
(45) Date of Patent: Apr. 12, 2016

(54) ELECTROCONDUCTIVE SHEET AND TOUCH PANEL

(71) Applicant: FUJIFILM Corporation, Minato-ku, Tokyo (JP)

(72) Inventor: Akira Ichiki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 331 days.

(21) Appl. No.: 13/966,898

(22) Filed: Aug. 14, 2013

(65) Prior Publication Data

US 2013/0327560 A1 Dec. 12, 2013

Related U.S. Application Data

(63) Continuation of application No. PCT/JP2012/054097, filed on Feb. 21, 2012.

(30) Foreign Application Priority Data

Feb. 24, 2011 (JP) ................................. 2011-038703

(51) Int. Cl.
*G06F 3/041* (2006.01)
*H01B 5/00* (2006.01)
*G06F 3/044* (2006.01)

(52) U.S. Cl.
CPC .................. *H01B 5/00* (2013.01); *G06F 3/044* (2013.01); *G06F 2203/04111* (2013.01); *G06F 2203/04112* (2013.01)

(58) Field of Classification Search
CPC ....... G06F 3/044; G06F 3/0412; G06F 3/047; B32B 15/02
See application file for complete search history.

(56) References Cited

U.S. PATENT DOCUMENTS 5,113,041 A 5/1992 Blonder et al.
5,691,553 A * 11/1997 Mori .................... H01L 29/404
257/328

(Continued)

FOREIGN PATENT DOCUMENTS

JP 5-224818 A 9/1993
JP 2003-99185 A 4/2003

(Continued)

OTHER PUBLICATIONS

Rejection of the Application, dated Sep. 16, 2014, issued in related JP Application No. 2012-035861, 6 pages in English and Japanese.

(Continued)

*Primary Examiner* — Aneeta Yodichkas
*Assistant Examiner* — Gerald Oliver
(74) *Attorney, Agent, or Firm* — Sughrue Mion, PLLC

(57) ABSTRACT

An electroconductive sheet and a touch panel having a first electroconductive section and a second electroconductive section, the second electroconductive section being disposed on the display-panel side. The first electroconductive section has a plurality of first electroconductive patterns arranged in the x-direction, a plurality of first large grids being respectively connected to the first electroconductive patterns. The second electroconductive section has a plurality of second electroconductive patterns arranged in the y-direction, a plurality of second large grids being respectively connected to the second electroconductive patterns. The area occupied by thin metal wires in the second electroconductive patterns is larger than the area occupied by thin metal wires in the first electroconductive patterns. The area occupied by thin metal wires in the second large grids is larger than the area occupied by thin metal wires in the first large grids.

19 Claims, 18 Drawing Sheets

(56) References Cited

U.S. PATENT DOCUMENTS

| | | |
|---|---|---|
| 7,202,859 B1 | 4/2007 | Speck et al. |
| 2003/0052867 A1 | 3/2003 | Shigetaka et al. |
| 2004/0229028 A1 | 11/2004 | Sasaki et al. |
| 2004/0239650 A1 | 12/2004 | Mackey |
| 2008/0211371 A1 | 9/2008 | Sasaki et al. |
| 2010/0060596 A1 | 3/2010 | Whight |
| 2011/0102370 A1 | 5/2011 | Kono et al. |
| 2014/0054070 A1 | 2/2014 | Ichiki |

FOREIGN PATENT DOCUMENTS

| | | |
|---|---|---|
| JP | 2009-271918 A | 11/2009 |
| JP | 2010039537 A | 2/2010 |
| JP | 2010176571 A | 8/2010 |
| JP | 2011-28699 A | 2/2011 |
| JP | 5615856 A | 9/2014 |
| WO | 95/27334 A1 | 10/1995 |
| WO | 97/18508 A1 | 5/1997 |
| WO | 2006/001461 A1 | 1/2006 |
| WO | 2010/013679 A1 | 2/2010 |
| WO | 2010014683 A2 | 2/2010 |

OTHER PUBLICATIONS

Notice of Allowance, mailed Mar. 17, 2015, issued in corresponding JP Application No. 2012-035861, 4 pages in English and Japanese.

Notification of the First Office Action, dated Aug. 27, 2015, issued in corresponding CN Application No. 201280009283.5, 24 pages in English and Chinese.

Notification of Reasons for Rejection, dated Sep. 10, 2015, issued in corresponding KR Application No. 10-2013-7022425, 6 pages in English and Korean.

Notification of Reasons for Refusal, dated Nov. 3, 2015, issued in Taiwanese Application No. 101105857, 14 pages in English and Chinese.

* cited by examiner

ELECTROCONDUCTIVE SHEET AND TOUCH PANEL

CROSS-REFERENCE TO RELATED APPLICATIONS AND PRIORITY CLAIMS

This application is a Continuation of International Application No. PCT/JP2012/054097 filed on Feb. 21, 2012, which was published under PCT Article 21(2) in Japanese, which is based upon and claims the benefit of priority from Japanese Patent Application No. 2011-038703 filed on Feb. 24, 2011, the contents all of which are incorporated herein by reference.

TECHNICAL FIELD

The present invention relates to a conductive sheet and a touch panel, for example suitable for use in a projected capacitive touch panel.

BACKGROUND ART

Transparent conductive films containing thin metal wires have been studied as disclosed in US Patent Application Publication No. 2004/0229028, International Publication No. 2006/001461, etc.

Touch panels have attracted much attention in recent years. Though the touch panels has currently been used mainly in small devices such as PDAs (personal digital assistants) and mobile phones, it is expected to be used in large devices such as personal computer displays.

A conventional electrode for the touch panel is composed of ITO (indium tin oxide) and therefore has a high resistance. Thus, when the conventional electrode is used in the large device in the above future trend, the large-sized touch panel has a low current transfer rate between the electrodes, and thereby exhibits a low response speed (a long time between finger contact and touch position detection).

A large number of lattices made of thin wires of metal (thin metal wires) can be arranged to form an electrode with a lowered surface resistance. Touch panels using the electrode of the thin metal wires are known from Japanese Laid-Open Patent Publication No. 05-224818, U.S. Pat. No. 5,113,041, International Publication No. 1995/27334, US Patent Application Publication No. 2004/0239650, U.S. Pat. No. 7,202,859, International Publication No. 1997/18508, Japanese Laid-Open Patent Publication No. 2003-099185, etc.

SUMMARY OF INVENTION

The touch panel electrode of the thin metal wires has problems with transparency and visibility because the thin metal wires are composed of an opaque material. In the case of using the electrode of the conductive sheet containing the thin metal wires on a display device, the conductive sheet is required to have the following two preferred visibility characteristics. The first characteristic is: when the display device is turned on to display an image, the thin metal wires are hardly visible, the conductive sheet exhibits a high visible light transmittance, and noise such as moire is hardly generated due to light interference between a period of pixels in the display device (such as a black matrix pattern in a liquid crystal display) and a conductive pattern. The second characteristic is: when the display device is turned off to show a black screen and is observed under an outside light such as a fluorescent light, sunlight, or LED light, the thin metal wires are hardly visible.

In general, the visibility can be improved by reducing the line width of the thin metal wires. However, the electrode containing the thin metal wires with the reduced line width disadvantageously has an increased resistance, which deteriorates the touch position detection sensitivity. Therefore, it is necessary to optimize the shapes of the conductive pattern and the thin metal wire pattern.

In view of the above problems, an object of the present invention is to provide a conductive sheet and a touch panel, which can have an electrode containing a pattern of less-visible, thin, metal wires, a high transparency, and an improved detection sensitivity.

[1] A conductive sheet according to a first aspect of the present invention is used on a display panel of a display device, and comprises a first conductive part disposed closer to an input operation surface and a second conductive part disposed closer to the display panel. The first and second conductive parts overlap with each other. The first conductive part contains a plurality of first conductive patterns composed of thin metal wires, and the first conductive patterns are arranged in one direction and each connected to a plurality of first electrodes. The second conductive part contains a plurality of second conductive patterns composed of the thin metal wires, and the second conductive patterns are arranged in a direction perpendicular to the one direction of the first conductive patterns and each connected to a plurality of second electrodes. The occupation area of the second conductive patterns is larger than the occupation area of the first conductive patterns. The thin metal wires have a line width of 6 μm or less and a line pitch of 200 μm or more and 500 μm or less, or alternatively the thin metal wires have a line width of more than 6 μm but at most 7 μm and a line pitch of 300 μm or more and 400 μm or less.

In general, the second conductive patterns, which are located closer to the display device, can act to reduce noise impact of an electromagnetic wave. Thus, a skin current flows in a particular direction to block an electric-field component of the electromagnetic wave, and an eddy current flows in a particular direction to block a magnetic-field component of the electromagnetic wave, to reduce the noise impact of the electromagnetic wave. Particularly in the first aspect, since the occupation area of the second conductive patterns closer to the display device is larger than that of the first conductive patterns, the second conductive patterns can have a low surface resistance to be advantageous in the reduction of the noise impact of the electromagnetic wave.

Furthermore, since the thin metal wires have a line width of 6 μm or less and a line pitch of 200 μm or more and 500 μm or less, or alternatively the thin metal wires have a line width of more than 6 μm but at most 7 μm and a line pitch of 300 μm or more and 400 μm or less, the thin metal wires can be less visible, ensuring a high transparency.

In addition, in the case of using a self-capacitance technology for detecting a finger touch position, even in a case where the second electrodes are positioned at a longer distance from the finger touch position than the first electrodes, the second electrodes can store a large amount of signal charge in the same manner as the first electrodes. The second electrodes can exhibit a detection sensitivity approximately equal to that of the first electrodes, the burden of signal processing can be reduced, and the detection accuracy can be improved. In the case of using a mutual capacitance technology for the finger touch position detection, the second electrodes having the larger occupation area can be used as drive electrodes, the first electrodes can be used as receiving electrodes, and the receiving sensitivity of the first electrodes can be improved.

Consequently, in the conductive sheet of the first aspect, even in the case of using the patterns of the thin metal wires in the electrodes, the thin metal wires are less visible, and the conductive sheet can have a high transparency, an improved S/N ratio of detection signal, an improved detection sensitivity, and an improved detection accuracy.

[2] In the first aspect, it is preferred that the thin metal wires have a line width of 5 μm or less and a line pitch of 200 μm or more and 400 μm or less, or alternatively the thin metal wires have a line width of more than 5 μm but at most 7 μm and a line pitch of 300 μm or more and 400 μm or less.

[3] Even in a case where the first conductive patterns partially overlap with the second conductive patterns to form a parasitic capacitance, the parasitic capacitance can be lowered to prevent detection sensitivity deterioration by disposing therebetween a substrate having a thickness of 75 μm or more and 350 μm or less.

[4] In the first aspect, it is preferred that when the first conductive patterns have an occupation area A1 and the second conductive patterns have an occupation area A2, the conductive sheet satisfies the condition of $1<A2/A1 \leq 20$.

[5] It is further preferred that the conductive sheet satisfies the condition of $1<A2/A1 \leq 10$.

[6] It is particularly preferred that the conductive sheet satisfies the condition of $2 \leq A2/A1 \leq 10$.

[7] In the first aspect, the first conductive part and/or the second conductive part contain auxiliary electrodes composed of the thin metal wires, the auxiliary electrodes are disposed between the first and second electrodes, the second conductive part contains additional auxiliary electrodes composed of the thin metal wires, and the additional auxiliary electrodes are disposed in positions corresponding to the first electrodes.

In this case, the occupation area of the thin metal wires in the second conductive patterns can be significantly larger than that in the first conductive patterns, and the second conductive patterns can more effectively act to reduce the noise impact of the electromagnetic wave, and the like.

[8] In a case where the occupation area of the thin metal wires in the additional auxiliary electrodes is increased while maintaining uniform light transmittance in the first and second electrodes, there is a possibility that the conductivity of the first electrodes is deteriorated. Therefore, it is preferred that the occupation area of the thin metal wires in the additional auxiliary electrodes is preferably ½ or less of the occupation area of the thin metal wires in the second electrodes.

[9] In the conductive sheet according to [7], the additional auxiliary electrodes, which are composed of the thin metal wires and disposed in the positions corresponding to the first electrodes, are combined with the first electrodes in the first conductive part to form lattice patterns. In this case, the visibility can be improved.

[10] In the conductive sheet according to [7], the thin metal wires are arranged into a mesh shape in the first electrodes. In this case, the conductivity of the first electrodes can be improved.

[11] In this case, it is preferred that the second electrodes each contain a combination of a plurality of first lattices, the first electrodes each contain a combination of a plurality of second lattices larger than the first lattices, the second lattices each have a length component, and the length of the length component is a real-number multiple of a side length of the first lattice.

[12] In the conductive sheet according to [7], the thin metal wires in the additional auxiliary electrodes, which are disposed in the positions corresponding to the first electrodes, have a straight line shape.

[13] In this case, from the viewpoint of improving the conductivity, it is preferred that the second electrodes each contain a combination of a plurality of the first lattices, and the length of the thin metal wire having the straight line shape in the additional auxiliary electrodes is a real-number multiple of a side length of the first lattice.

[14] In the conductive sheet according to [7], the thin metal wires in the additional auxiliary electrodes, which are disposed in the positions corresponding to the first electrodes, may have a mesh shape.

[15] In this case, the second electrodes may each contain a combination of a plurality of the first lattices, the additional auxiliary electrodes may each contain a combination of a plurality of the second lattices larger than the first lattices, the second lattices may each have a length component, and the length of the length component may be a real-number multiple of a side length of the first lattice.

[16] In the first aspect, the conductive sheet may further comprise a substrate, and the first and second conductive parts may be arranged facing each other with the substrate interposed therebetween.

[17] In this case, the first conductive part may be formed on one main surface of the substrate, and the second conductive part may be formed on the other main surface of the substrate.

[18] In the conductive sheet according to [7], the conductive sheet may further comprise a substrate, the first and second conductive parts may be arranged facing each other with the substrate interposed therebetween, the first and second electrodes may each have a mesh pattern, the auxiliary patterns of the additional auxiliary electrodes composed of the thin metal wires may be disposed between the second electrodes in the positions corresponding to the first electrodes, the second electrodes may be arranged adjacent to the first electrodes as viewed from above, the first electrodes may overlap with the auxiliary patterns to form combined patterns, and the combined patterns may each contain a combination of mesh shapes. In this case, the visibility can be improved.

[19] In this case, it is preferred that the second electrodes each contain a first large lattice containing a combination of a plurality of first small lattices, the first electrodes each contain a second large lattice containing a combination of a plurality of second small lattices larger than the first small lattices, the first large lattices in the combined patterns are arranged adjacent to the second large lattices, the first large lattices overlap with the auxiliary patterns to form the combined patterns, and the combined patterns each contain a combination of two or more first small lattices.

[20] A touch panel according to a second aspect of the present invention comprises a conductive sheet, which is used on a display panel of a display device. The conductive sheet has a first conductive part disposed closer to an input operation surface and a second conductive part disposed closer to the display panel. The first and second conductive parts overlap with each other. The first conductive part contains a plurality of first conductive patterns composed of thin metal wires, and the first conductive patterns are arranged in one direction and each connected to the plurality of first electrodes. The second conductive part contains a plurality of second conductive patterns composed of the thin metal wires, and the second conductive patterns are arranged in a direction perpendicular to the one direction of the first conductive patterns and each connected to the plurality of second electrodes. An occupation area of the second conductive patterns is larger than an occupation area of the first conductive patterns. The thin metal wires have a line width of 6 μm or less and a line pitch of 200 μm or more and 500 μm or less, or alternatively the thin metal wires have a line width of more than 6 µm but at most 7 µm and a line pitch of 300 µm or more and 400 µm or less.

As described above, the conductive sheet and the touch panel of the present invention can have the electrodes containing the patterns of less visible thin metal wires, a high transparency, and an improved detection sensitivity.

DESCRIPTION OF EMBODIMENTS

Figure 1:
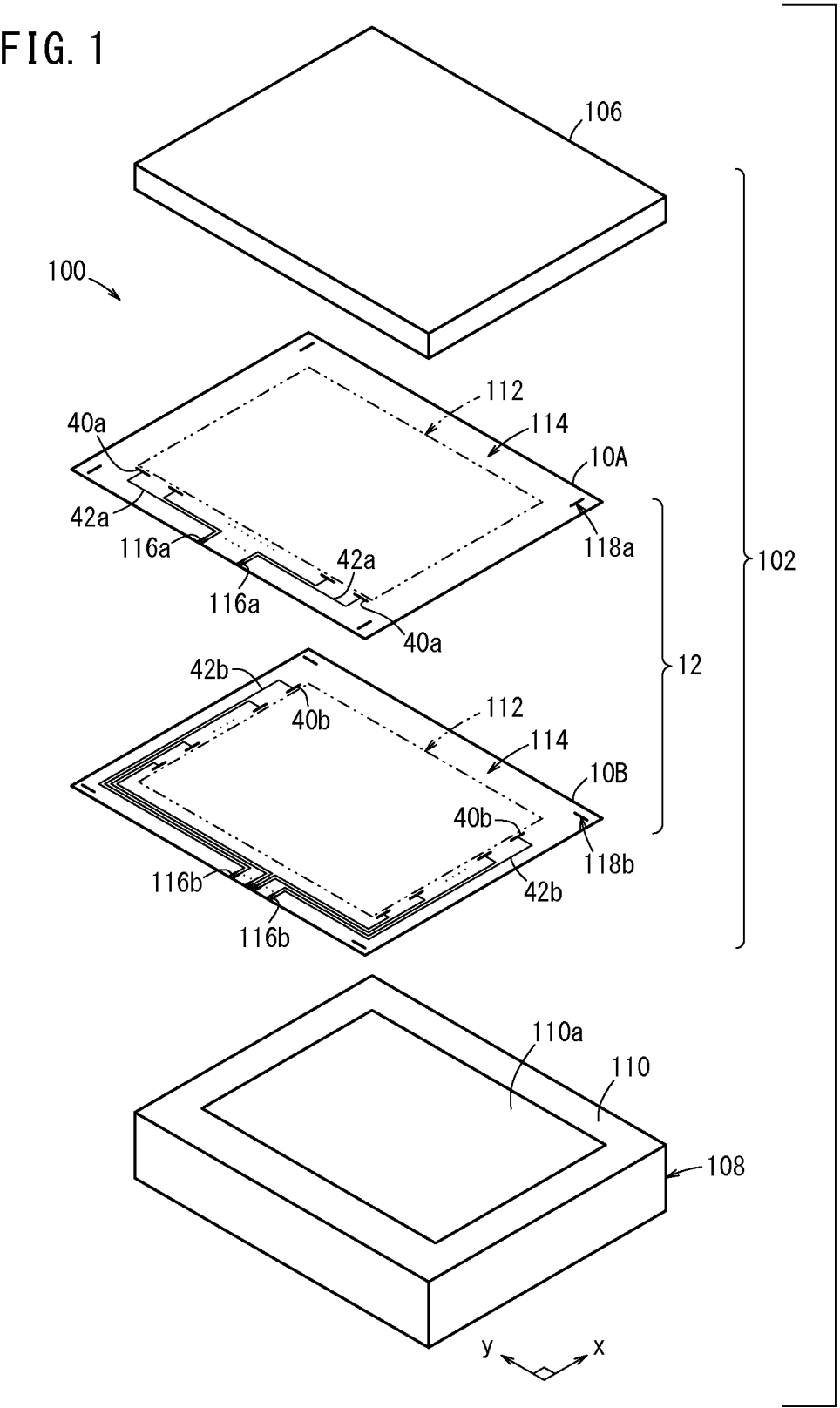
FIG. 1 is an exploded perspective view of a touch panel according to an embodiment of the present invention.

Several embodiments of the conductive sheet and the touch panel of the present invention will be described below with reference to FIGS. 1 to 18. It should be noted that, in this description, a numeric range of "A to B" includes both the numeric values A and B as the lower limit and upper limit values.

A touch panel having a conductive sheet according to an embodiment of the present invention will be described below with reference to FIG. 1.

The touch panel 100 has a sensor body 102 and a control circuit such as an integrated circuit (not shown). The sensor body 102 contains a conductive sheet stack 12 according to this embodiment and thereon a protective layer 106. The conductive sheet stack 12 and the protective layer 106 can be disposed on a display panel 110 of a display device 108 such as a liquid crystal display. As viewed from above, the sensor body 102 has a touch position sensing region 112 corresponding to a display screen 110a of the display panel 110 and a terminal wiring region 114 (a so-called frame) corresponding to the periphery of the display panel 110.

Figure 2:
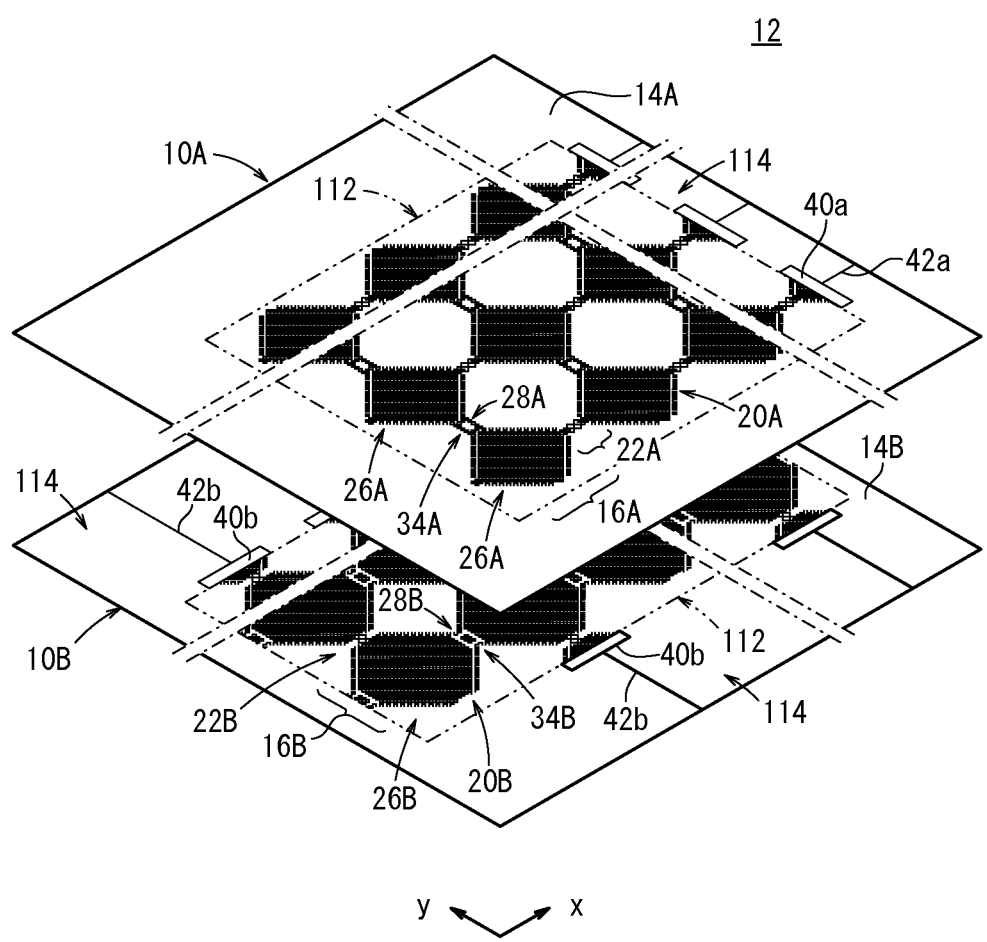
FIG. 2 is a partially omitted, exploded perspective view of a conductive sheet stack.

As shown in FIG. 2, the conductive sheet stack 12 is provided by stacking a first conductive sheet 10A and a second conductive sheet 10B.

Figure 3A:
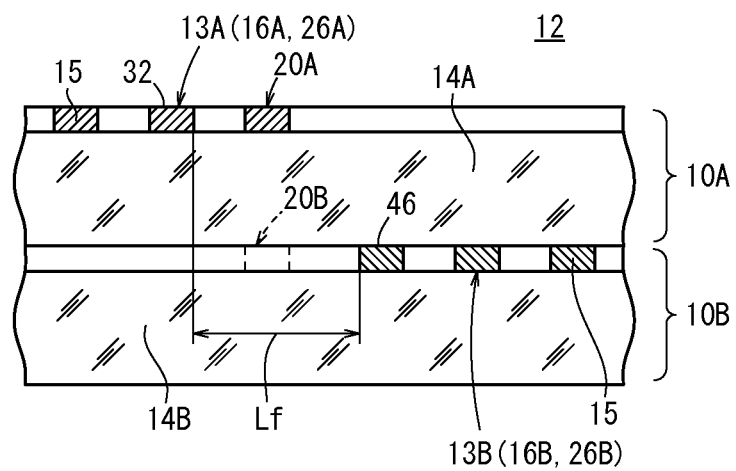
FIG. 3A is a partially omitted, cross-sectional view of an example of the conductive sheet stack.
Figure 4:
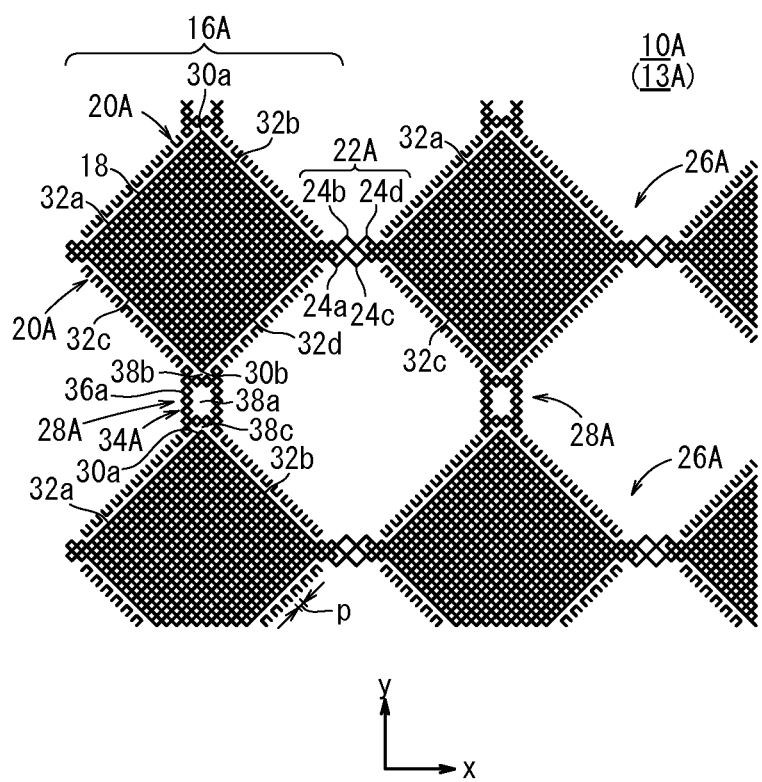
FIG. 4 is a plan view of a pattern example of a first conductive part formed on a first conductive sheet.

The first conductive sheet 10A has a first conductive part 13A formed on one main surface of a first transparent substrate 14A (see FIG. 3A). As shown in FIG. 4, the first conductive part 13A contains two or more first conductive large lattices 16A (first electrodes) composed of thin metal wires 15 (see FIG. 3A). The first large lattice 16A contains a combination of two or more small lattices 18. First auxiliary patterns 20A (auxiliary electrodes) composed of the thin metal wires 15 are arranged around the first large lattices 16A, and are not connected to the first large lattices 16A. First connections 22A composed of the thin metal wires 15 are formed between the first large lattices 16A, and each adjacent two of the first large lattices 16A are electrically connected by the first connection 22A. The first connection 22A contains one or more medium lattices 24 (24a to 24d), and the pitch of the medium lattices 24 is n times larger than that of the small lattices 18 (in which n is a real number larger than 1). The small lattice 18 has a smallest square shape. For example, the thin metal wires 15 contain gold (Au), silver (Ag), or copper (Cu). At least the first transparent substrate 14A has a thickness of 75 µm or more and 350 µm or less.

The side length of the first large lattice 16A is preferably 3 to 10 mm, more preferably 4 to 6 mm. The side length of the small lattice 18 in the first large lattice 16A is preferably 50 to 500 µm, further preferably 150 to 300 µm.

The lower limit of the line width of the thin metal wire 15 is preferably 1 µm or more, 3 µm or more, 4 µm or more, or 5 µm or more, and the upper limit is preferably 15 µm or less, 10 µm or less, 9 µm or less, or 8 µm or less. When the line width is less than the lower limit, the conductive sheet has an insufficient conductivity, whereby the touch panel 100 using the sheet has an insufficient detection sensitivity. On the other hand, when the line width is more than the upper limit, moire is significantly generated due to the conductive metal portion, and the touch panel 100 using the sheet has a poor visibility. When the line width is within the above range, the moire generated due to the conductive metal portion is improved, and the visibility is remarkably improved.

Two or more first large lattices 16A are arranged in one direction (a first direction, an x direction) with the first connections 22A disposed therebetween to form one first conductive pattern 26A composed of the thin metal wires 15. Two or more first conductive patterns 26A are arranged in a y direction (a second direction) perpendicular to the x direction. An electrically isolated first insulation 28A is disposed between the adjacent first conductive patterns 26A.

The first conductive pattern 26A is not limited to the example using the first large lattices 16A. For example, the first conductive pattern 26A may be such that a large number of the small lattices 18 are arranged to form a strip-shaped mesh pattern, and a plurality of the strip-shaped mesh patterns are arranged in parallel and are isolated from each other by insulations. For example, two or more of strip-shaped first conductive patterns 26A may each extend from a terminal in the x direction and may be arranged in the y direction.

As shown in FIG. 4, four sides 32 of the first large lattice 16A each have a straight line shape. Among the four sides, the first side 32a and the second side 32b are positioned next to one corner 30a unconnected to the adjacent first large lattice 16A, and the third side 32c and the fourth side 32d are positioned next to the other corner 30b unconnected to the adjacent first large lattice 16A. In other words, the intersection of the straight lines of the first side 32a and the second side 32b corresponds to the one corner 30a of the first large lattice 16A, and the intersection of the straight lines of the third side 32c and the fourth side 32d corresponds to the other corner 30b of the first large lattice 16A.

In the first connection 22A, the four medium lattices 24 (the first medium lattice 24a to the fourth medium lattice 24d) are arranged in a zigzag manner, and each of the medium lattices 24 has a size equal to the total of four small lattices 18. The first medium lattice 24a is disposed at the intersection of the second side 32b and the fourth side 32d, and forms an L-shaped space in combination with one small lattice 18. The second medium lattice 24b is disposed on one side of the first medium lattice 24a, and forms such a square space that four small lattices 18 are arranged in a matrix and the central cross is removed. The third medium lattice 24c is adjacent to one vertex of the first medium lattice 24a and one side of the second medium lattice 24b, and has the same shape as the second medium lattice 24b. The fourth medium lattice 24d is disposed at the intersection of the third side 32c and the first side 32a, is adjacent to one vertex of the second medium lattice 24b and one side of the third medium lattice 24c, and forms an L-shaped space in combination with one small lattice 18 as well as the first medium lattice 24a. When the small lattices 18 have an arrangement pitch of P, the medium lattices 24 have an arrangement pitch of 2P.

The above described first auxiliary pattern 20A is formed around each of the four sides 32 (the first side 32a to the fourth side 32d) of the first large lattice 16A. The first auxiliary pattern 20A is formed such that a part of the small lattice 18 is removed to provide a remaining part, and two or more remaining parts are arranged along the corresponding straight side. In the example of FIG. 4, the remaining part is provided by removing one side from the small lattice 18 and thus has a shape with two corners and one opening (referred to simply as an approximately U shape), and ten remaining parts are arranged such that the openings are opened in the direction away from the corresponding side of the first large lattice 16A. The arrangement pitch of the remaining parts is twice as large as the arrangement pitch P of the small lattices 18 in the first large lattices 16A. For example, the shortest distance between the straight line shape of the first side 32a and the approximately U shape of the first auxiliary pattern 20A is approximately equal to the inside side length of the small lattice 18. This is true also for the second side 32b to the fourth side 32d.

In the first insulation 28A, a first insulation pattern 34A unconnected to the first large lattices 16A is formed. The first insulation pattern 34A has a first assembly pattern portion 36a containing two or more small lattices 18 arranged and three spaces 38 (38a to 38c) containing no small lattices 18.

Specifically, the first assembly pattern portion 36a contains a combination of four straight lines composed of a plurality of the small lattices 18 (two long straight lines and two short straight lines). Each of the straight lines is formed by arranging a plurality of the small lattices 18 to connect the vertices of the small lattices 18. With respect to the adjacent two first large lattices 16A (or two second large lattices 16B) arranged with the first insulation 28A interposed therebetween, the three spaces 38 include the first space 38a containing no small lattices 18 surrounded by the first assembly pattern portion 36a, the second space 38b containing no small lattices 18 formed around the other corner 30b of one first large lattice 16A, and the third space 38c containing no small lattices 18 formed around the one corner 30a of the other first large lattice 16A.

For example, among the four straight lines, each of the two long straight lines is formed by arranging seven small lattices 18 to connect the vertices thereof. The small lattice 18 in one end of one long straight line is positioned adjacent to the first auxiliary pattern 20A along the third side 32c of the one first large lattice 16A at the same pitch around the other corner 30b of the one first large lattice 16A, and the small lattice 18 in the other end of the one long straight line is positioned adjacent to the first auxiliary pattern 20A along the first side 32a of the other first large lattice 16A at the same pitch around the one corner 30a of the other first large lattice 16A. Similarly, the small lattice 18 in one end of the other long straight line is positioned adjacent to the first auxiliary pattern 20A along the fourth side 32d of the one first large lattice 16A at the same pitch around the other corner 30b of the one first large lattice 16A, and the small lattice 18 in the other end of the other long straight line is positioned adjacent to the first auxiliary pattern 20A along the second side 32b of the other first large lattice 16A at the same pitch around the one corner 30a of the other first large lattice 16A.

Among the two short straight lines, one short straight line contains two small lattices 18 connecting the second small lattice 18 in the one long straight line from the one end and the second small lattice 18 in the other long straight line from the one end. Similarly, the other short straight line contains two small lattices 18 connecting the second small lattice 18 in the one long straight line from the other end and the second small lattice 18 in the other long straight line from the other end.

When the small lattices 18 have an arrangement pitch of P, the first insulation 28A has a width of m×P (in which m is an integer of 1 or more). The width of the first insulation 28A is defined as the shortest distance between the adjacent first conductive patterns 26A (i.e. the distance between the other corner 30b of the one first large lattice 16A and the one corner 30a of the other first large lattice 16A). Thus, the first insulation pattern 34A has a maximum length of m×P or less in the width direction of the first insulation 28A. The maximum length is the distance between a part in the one short straight line facing the other corner 30b of the one first large lattice 16A and a part in the other short straight line facing the one corner 30a of the other first large lattice 16A.

As described above, in the first conductive sheet 10A, the first conductive patterns 26A composed of the thin metal wires 15 each contain two or more first large lattices 16A connected in series in the first direction, the first large lattices 16A each contain a combination of two or more small lattices 18, the first auxiliary patterns 20A composed of the thin metal wires 15 are formed around the sides of the first large lattices 16A and are not connected to the first large lattices 16A, the thin metal wires 15 have a line width of 1 to 15 μm, and the small lattices 18 have a side length of 50 to 500 μm. Therefore, the first conductive sheet 10A can exhibit a significantly lowered electrical resistance as compared with conventional structures using one ITO film for one electrode. Thus, in a case where the first conductive sheet 10A is used in a projected capacitive touch panel 100 or the like, the response speed and the size of the touch panel 100 can be easily increased.

In one end of the first conductive pattern 26A, the first connection 22A is not formed on the open end of the first electrode 16A. In the other end of the first conductive pattern 26A, the end of the first large lattice 16A is electrically connected to a first terminal wiring pattern 42a composed of a thin metal wire by a first wire connection 40a.

As shown in FIG. 2, in the first conductive sheet 10A used in the touch panel 100, a large number of the above first conductive patterns 26A are arranged in the sensing region 112, and a plurality of the first terminal wiring patterns 42a composed of the thin metal wires 15 extend from the first wire connections 40a in the terminal wiring region 114.

In the example of FIG. 1, the first conductive sheet 10A and the sensing region 112 each have a rectangular shape as viewed from above. In the terminal wiring region 114, a plurality of first terminals 116a are arranged in the longitudinal center in the length direction of the periphery on one long side of the first conductive sheet 10A. The first wire connections 40a are arranged in a straight line in the y direction along one long side of the sensing region 112 (a long side closest to the one long side of the first conductive sheet 10A). The first terminal wiring pattern 42a extends from each first wire connection 40a to the center of the one long side of the first conductive sheet 10A, and is electrically connected to the corresponding first terminal 116a. Thus, the first terminal wiring patterns 42a, connected to each pair of corresponding first wire connections 40a formed on the right and left of the one long side of the sensing region 112, have approximately the same lengths. Of course, the first terminals 116a may be formed in a corner of the first conductive sheet 10A or the vicinity thereof. However, in this case, the length difference between the longest first terminal wiring pattern 42a and the shortest first terminal wiring pattern 42a is increased, whereby the longest first terminal wiring pattern 42a and the first terminal wiring patterns 42a in the vicinity thereof are disadvantageously poor in the rate of transferring signal to the corresponding first conductive pattern 26A. Thus, in this embodiment, the first terminals 116a are formed in the longitudinal center of the one long side of the first conductive sheet 10A, whereby the local signal transfer rate deterioration is prevented to increase the response speed.

Figure 5:
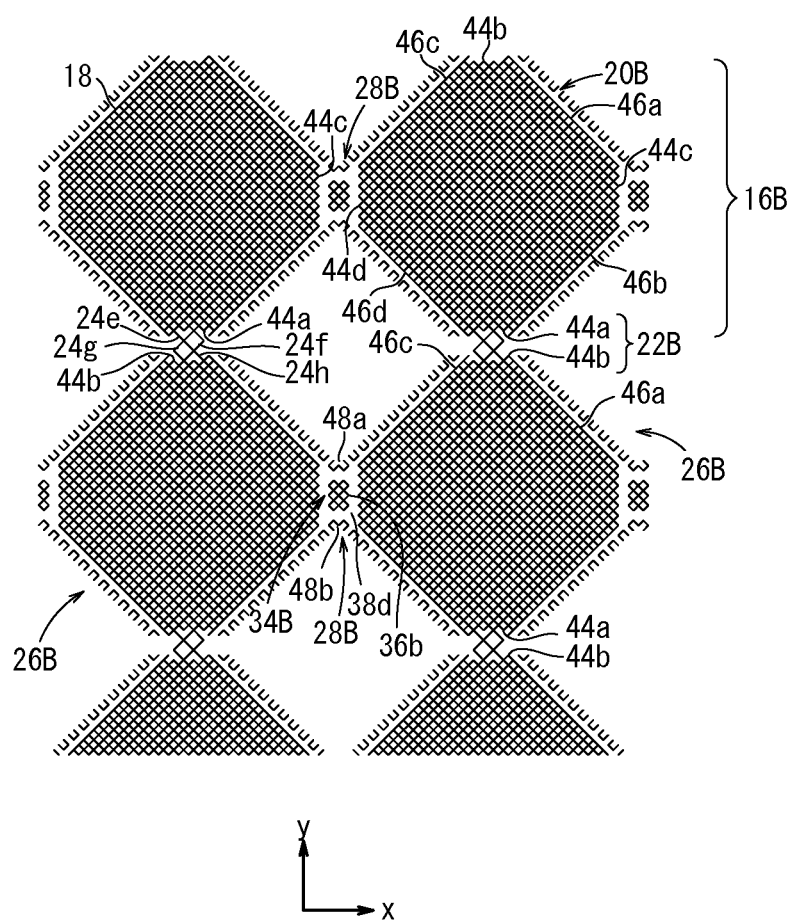
FIG. 5 is a plan view of a pattern example of a second conductive part formed on a second conductive sheet.

On the other hand, as shown in FIGS. 2, 3A, and 5, the second conductive sheet 10B has a second conductive part 13B formed on one main surface of a second transparent substrate 14B (see FIG. 3A). The second conductive part 13B contains two or more second large lattices 16B (second electrodes), which are conductive and composed of the thin metal wires 15. The second large lattice 16B contains a combination of two or more small lattices 18. Second auxiliary patterns 20B (auxiliary electrodes) are arranged around the sides of the second large lattices 16B, and are not connected to the second large lattices 16B. Second connections 22B composed of the thin metal wires 15 are formed between the second large lattices 16B, and each adjacent two of the second large lattices 16B are electrically connected by the second connection 22B. The second connection 22B contains one or more medium lattices 24 (24e to 24h), and the pitch of the medium lattices 24 is n times larger than that of the small lattices 18 (in which n is a real number larger than 1). The side length of the second large lattice 16B, as well as the above first large lattice 16A, is preferably 3 to 10 mm, more preferably 4 to 6 mm.

Two or more second large lattices 16B are arranged in the y direction (the second direction) with the second connections 22B disposed therebetween to form one second conductive pattern 26B. Two or more second conductive patterns 26B are arranged in the x direction (the first direction). An electrically isolated second insulation 28B is disposed between the adjacent second conductive patterns 26B.

Also the second conductive pattern 26B is not limited to the example using the second large lattices 16B. For example, the second conductive pattern 26B may be such that a large number of the small lattices 18 are arranged to form a strip-shaped mesh pattern, and a plurality of the strip-shaped mesh patterns are arranged in parallel and are isolated from each other by insulations. For example, two or more of strip-shaped second conductive patterns 26B may each extend from a terminal in the y direction and may be arranged in the x direction.

As shown in FIG. 5, the second large lattice 16B has an approximately octagonal shape unlike the first large lattice 16A. The second large lattice 16B has four short sides 44 (a first short side 44a to a fourth short side 44d) and four long sides 46 (a first long side 46a to a fourth long side 46d). With respect to the second large lattices 16B arranged adjacent in the y direction, the second connection 22B is formed between the first short side 44a of one second large lattice 16B and the second short side 44b of the other second large lattice 16B. With respect to the second large lattices 16B arranged adjacent in the x direction, the second insulation 28B is formed between the third short side 44c of one second large lattice 16B and the fourth short side 44d of the other second large lattice 16B.

The four long sides of the second large lattice 16B each have a straight line shape. Among the four long sides, the first long side 46a and the second long side 46b are adjacent to the third short side 44c facing one second insulation 28B, and the third long side 46c and the fourth long side 46d are adjacent to the fourth short side 44d facing another second insulation 28B.

In the second connection 22B, the four medium lattices 24 (the fifth medium lattice 24e to the eighth medium lattice 24h) are arranged in a zigzag manner, and each of the medium lattices 24 has a size equal to the total of four small lattices 18. The fifth medium lattice 24e is disposed on the first short side 44a, and forms an L-shaped space in combination with one small lattice 18. The sixth medium lattice 24f is disposed on one side of the fifth medium lattice 24e, and forms such a square space that four small lattices 18 are arranged in a matrix and the central cross is removed. The seventh medium lattice 24g is adjacent to one vertex of the fifth medium lattice 24e and one side of the sixth medium lattice 24f, and has the same shape as the sixth medium lattice 24f. The eighth medium lattice 24h is disposed on the second short side 44b, is adjacent to one vertex of the sixth medium lattice 24f and one side of the seventh medium lattice 24g, and forms an L-shaped space in combination with one small lattice 18 as well as the fifth medium lattice 24e. When the small lattices 18 have an arrangement pitch of P, the medium lattices 24 have an arrangement pitch of 2P.

The above described second auxiliary pattern 20B is formed around each of the four long sides 46 of the second large lattice 16B (the first long side 46a to the fourth long side 46d). The second auxiliary pattern 20B is formed such that a part of the small lattice 18 is removed to provide a remaining part, and two or more remaining parts are arranged along the corresponding side (straight line shape). In the example of FIG. 5, the remaining part is provided by removing one side from the small lattice 18 and thus has an approximately U shape, and ten remaining parts are arranged such that the openings are opened in the direction away from the corresponding long side of the second large lattice 16B. The arrangement pitch of the remaining parts is twice as large as the arrangement pitch P of the small lattices 18 in the second large lattices 16B. For example, the shortest distance between the straight line shape of the first long side 46a and the approximately U shape of the second auxiliary pattern 20B is approximately equal to the inside side length of the small lattice 18. This is true also for the second long side 46b to the fourth long side 46d.

In the second insulation 28B, a second insulation pattern 34B unconnected to the second large lattices 16B is formed. The second insulation pattern 34B has a second assembly pattern portion 36b containing two or more small lattices 18 arranged, a first bend pattern portion 48a and a second bend pattern portion 48b each containing two approximately U shapes, and a fourth space 38d containing no small lattices 18.

Specifically, the second assembly pattern portion 36b is formed by arranging a plurality of the small lattices 18 in a matrix to connect the vertices of the small lattices 18. The number of the small lattices 18 that can be placed in the first space 38a of the first insulation pattern 34A in the first conductive pattern 26A shown in FIG. 4 is, for example, 6.

The first bend pattern portion 48a has the two approximately U shapes formed on one end of the second insulation pattern 34B (between the intersection of the fourth short side 44d and the third long side 46c in one second large lattice 16B and the intersection of the third short side 44c and the first long side 46a in another second large lattice 16B). The ends of the two approximately U shapes are connected, an angle formed by the sides at the ends being approximately 90°.

Similarly, the second bend pattern portion 48b has the two approximately U shapes formed on the other end of the second insulation pattern 34B (between the intersection of the fourth short side 44d and the fourth long side 46d in the one second large lattice 16B and the intersection of the third short side 44c and the second long side 46b in the other second large lattice 16B). The ends of the two approximately U shapes are connected, an angle formed by the sides at the ends being approximately 90°.

The fourth space 38d containing no small lattices 18 has a blank area, in which the four straight lines of the first assembly pattern portion 36a in the first insulation pattern 34A shown in FIG. 4 can be placed.

When the small lattices 18 have an arrangement pitch of P, the second insulation 28B has a width of n×P (in which n is an integer of 1 or more). The width of the second insulation 28B is defined as the shortest distance between the adjacent second conductive patterns 26B (i.e. the distance between the fourth short side 44d of one second large lattice 16B and the third short side 44c of the other second large lattice 16B). Thus, the second insulation pattern 34B has a maximum length of n×P or less, preferably less than n×P, in the width direction of the second insulation 28B. The maximum length is the distance between a part facing the fourth short side 44d of the one second large lattice 16B and a part facing the third short side 44c of the other second large lattice 16B in the second assembly pattern portion 36b.

For example, in each of one end of each alternate (odd-numbered) second conductive pattern 26B and the other end of each even-numbered second conductive pattern 26B, the second connection 28B is not formed on the open end of the second electrode 16B. In each of the other end of each odd-numbered second conductive pattern 26B and one end of each even-numbered second conductive pattern 26B, the end of the second electrode 16B is electrically connected to a second terminal wiring pattern 42b composed of a thin metal wire by a second wire connection 40b.

As shown in FIG. 2, in the second conductive sheet 10B of the touch panel 100, a large number of the second conductive patterns 26B are arranged in the sensing region 112, and a plurality of the second terminal wiring patterns 42b extend from the second wire connections 40b in the terminal wiring region 114.

As shown in FIG. 1, in the terminal wiring region 114, a plurality of second terminals 116b are arranged in the longitudinal center in the length direction of the periphery on one long side of the second conductive sheet 10B. For example, the odd-numbered second wire connections 40b are arranged in a straight line in the x direction along one short side of the sensing region 112 (a short side closest to one short side of the second conductive sheet 10B), and the even-numbered second wire connections 40b are arranged in a straight line in the x direction along the other short side of the sensing region 112 (a short side closest to the other short side of the second conductive sheet 10B).

For example, each odd-numbered second conductive pattern 26B is connected to the corresponding odd-numbered second wire connection 40b, and each even-numbered second conductive pattern 26B is connected to the corresponding even-numbered second wire connection 40b. The second terminal wiring patterns 42b extend from the odd-numbered and even-numbered second wire connections 40b to the center of one long side of the second conductive sheet 10B, and are each electrically connected to the corresponding second terminal 116b. Thus, for example, the 1st and 2nd second terminal wiring patterns 42b have approximately the same lengths, and similarly the (2n−1)-th and (2n)-th second terminal wiring patterns 42b have approximately the same lengths (n=1, 2, 3, ... ).

Of course, the second terminals 116b may be formed in a corner of the second conductive sheet 10B or the vicinity thereof. However, in this case, as described above, the longest second terminal wiring pattern 42b and the second terminal wiring patterns 42b in the vicinity thereof are disadvantageously poor in the rate of transferring signal to the corresponding second conductive pattern 26B. Thus, in this embodiment, the second terminals 116b are formed in the longitudinal center of the one long side of the second conductive sheet 10B, whereby the local signal transfer rate deterioration is prevented to increase the response speed.

The first terminal wiring patterns 42a may be arranged in the same manner as the above second terminal wiring patterns 42b, and the second terminal wiring patterns 42b may be arranged in the same manner as the above first terminal wiring patterns 42a.

When the conductive sheet stack 12 is used in a touch panel, the protective layer 106 is formed on the first conductive sheet 10A, and the first terminal wiring patterns 42a extending from the first conductive patterns 26A in the first conductive sheet 10A and the second terminal wiring patterns 42b extending from the second conductive patterns 26B in the second conductive sheet 10B are connected to a scan control circuit or the like.

A self or mutual capacitance technology can be preferably used for detecting a touch position. In the self-capacitance technology, a voltage signal for the touch position detection is sequentially supplied to the first conductive patterns 26A, and further a voltage signal for the touch position detection is sequentially supplied to the second conductive patterns 26B. When a finger comes into contact with or close to the upper surface of the protective layer 106, the capacitance between the first conductive pattern 26A and the second conductive pattern 26B in the touch position and the GND (ground) is increased, whereby signals from this first conductive pattern 26A and this second conductive pattern 26B have waveforms different from those of signals from the other conductive patterns. Thus, the touch position is calculated by a control circuit based on the signals transmitted from the first conductive pattern 26A and the second conductive pattern 26B. On the other hand, in the mutual capacitance technology, for example, a voltage signal for the touch position detection is sequentially supplied to the first conductive patterns 26A, and the second conductive patterns 26B are sequentially subjected to sensing (transmitted signal detection). When a finger comes into contact with or close to the upper surface of the protective layer 106, the parallel stray capacitance of the finger is added to the parasitic capacitance between the first conductive pattern 26A and the second conductive pattern 26B in the touch position, whereby a signal from this second conductive pattern 26B has a waveform different from those of signals from the other second conductive patterns 26B. Thus, the touch position is calculated by a control circuit based on the order of the first conductive pattern 26A supplied with the voltage signal and the signal transmitted from the second conductive pattern 26B. Even when two fingers come into contact with or close to the upper surface of the protective layer 106 simultaneously, the touch positions can be detected by using the self or mutual capacitance technology. Conventional related detection circuits used in projected capacitive technologies are described in U.S. Pat. Nos. 4,582,955, 4,686,332, 4,733,222, 5,374,787, 5,543,588, and 7,030,860, US Patent Publication No. 2004/0155871, etc.

In this embodiment, in the terminal wiring region 114, the first terminals 116a are formed in the longitudinal center of the periphery on the one long side of the first conductive sheet 10A, and the second terminals 116b are formed in the longitudinal center of the periphery on the one long side of the second conductive sheet 10B. Particularly, in the example of FIG. 1, the first terminals 116a and the second terminals 116b are close to each other and do not overlap with each other, and the first terminal wiring patterns 42a and the second terminal wiring patterns 42b do not overlap with each other. For example, the first terminal 116a may partially overlap with the odd-numbered second terminal wiring pattern 42b.

Thus, the first terminals 116a and the second terminals 116b can be electrically connected to the control circuit by using a cable and two connectors (a connector for the first terminals 116a and a connector for the second terminals 116b) or one connector (a complex connector for the first terminals 116a and the second terminals 116b).

Since the first terminal wiring patterns 42a and the second terminal wiring patterns 42b do not vertically overlap with each other, a parasitic capacitance is reduced between the first terminal wiring patterns 42a and the second terminal wiring patterns 42b to prevent the response speed deterioration.

Since the first wire connections 40a are arranged along the one long side of the sensing region 112 and the second wire connections 40b are arranged along the both short sides of the sensing region 112, the area of the terminal wiring region 114 can be reduced. Therefore, the size of the display panel 110 containing the touch panel 100 can be easily reduced, and the display screen 110a can be made to seem larger. Also the operability of the touch panel 100 can be improved.

The area of the terminal wiring region 114 may be further reduced by reducing the distance between the adjacent first terminal wiring patterns 42a or the adjacent second terminal wiring patterns 42b. The distance is preferably 10 to 50 µm in view of preventing migration.

Alternatively, the area of the terminal wiring region 114 may be reduced by arranging the second terminal wiring pattern 42b between the adjacent first terminal wiring patterns 42a in the view from above. However, when the pattern is misaligned, the first terminal wiring pattern 42a may vertically overlap with the second terminal wiring pattern 42b, increasing the parasitic capacitance therebetween undesirably. This leads to deterioration of the response speed. Thus, in the case of using such an arrangement, the distance between the adjacent first terminal wiring patterns 42a is preferably 50 µm or more and 100 µm or less.

As shown in FIG. 1, first alignment marks 118a and second alignment marks 118b are preferably formed, for example, on the corners of the first conductive sheet 10A and the second conductive sheet 10B. The first alignment marks 118a and the second alignment marks 118b are used for positioning the sheets in the process of bonding the sheets. When the first conductive sheet 10A and the second conductive sheet 10B are bonded to obtain the conductive sheet stack 12, the first alignment marks 118a and the second alignment marks 118b form composite alignment marks. The composite alignment marks may be used for positioning the conductive sheet stack 12 in the process of attaching the conductive sheet stack 12 to the display panel 110.

Figure 6:
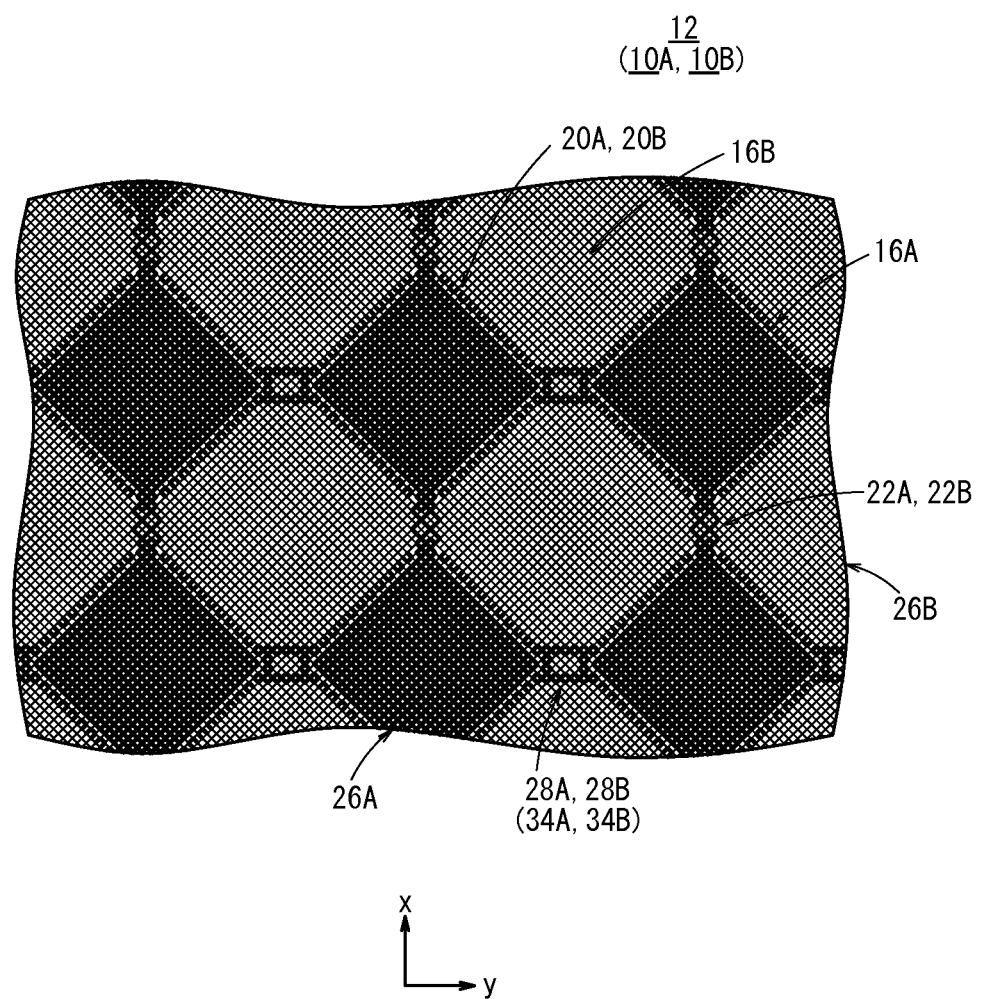
FIG. 6 is a partially omitted, plan view of the first conductive sheet stack formed by combining the first and second conductive sheets.

As shown in FIG. 6, when the first conductive sheet 10A is stacked on the second conductive sheet 10B to form the conductive sheet stack 12, the first connections 22A of the first conductive patterns 26A and the second connections 22B of the second conductive patterns 26B are arranged facing each other with the first transparent substrate 14A (see FIG. 3A) interposed therebetween, and the first insulations 28A of the first conductive patterns 26A and the second insulations 28B of the second conductive patterns 26B are arranged facing each other with the first transparent substrate 14A interposed therebetween. Though the first conductive patterns 26A and the second conductive patterns 26B are exaggeratingly shown by thick lines and thin lines respectively to clearly represent the positions thereof in FIG. 6, the first conductive patterns 26A and the second conductive patterns 26B have the same line width.

When the stacked first conductive sheet 10A and second conductive sheet 10B are observed from above, the spaces between the first large lattices 16A of the first conductive sheet 10A are filled with the second large lattices 16B of the second conductive sheet 10B. Thus, the surface is covered with the large lattices. In this case, the first auxiliary patterns 20A and the second auxiliary patterns 20B overlap with each other to form combined patterns (auxiliary electrodes) between the first large lattices 16A and the second large lattices 16B. The combined pattern has a width equal to or larger than the side length of the small lattice 18. The width of the combined pattern is defined as the shortest distance projected on the one main surface of the first transparent substrate 14A for example between the first side 32a of the first large lattice 16A and the second long side 46b (facing the first side 32a) of the second large lattice 16B. In the example of FIG. 6, the width of the combined pattern is twice as large as the side length of the small lattice 18. This is true also for the relations between the second side 32b to the fourth side 32d of the first large lattice 16A and the second long side 46b to the fourth long side 46d of the second large lattice 16B.

Thus, the openings of the approximately U shapes in the first auxiliary patterns 20A along the first large lattices 16A are closed by the straight long sides of the second large lattices 16B, and the bottoms of the approximately U shapes in the first auxiliary patterns 20A are connected by the bottoms of the approximately U shapes in the second auxiliary patterns 20B along the second large lattices 16B. Similarly, the openings of the approximately U shapes in the second auxiliary patterns 20B along the second large lattices 16B are closed by the straight long sides of the first large lattices 16A, and the bottoms of the approximately U shapes in the second auxiliary patterns 20B are connected by the bottoms of the approximately U shapes in the first auxiliary patterns 20A along the first large lattices 16A. As a result, as viewed from above, a plurality of the small lattices 18 are arranged, and the boundaries between the first large lattices 16A and the second large lattices 16B can hardly be found.

For example, in the case of not forming the first auxiliary patterns 20A and the second auxiliary patterns 20B, blank areas corresponding to the combined pattern width are formed, whereby the edges of the first large lattices 16A and the second large lattices 16B are highly visible, deteriorating the visibility. This problem may be solved by overlapping each side of the first large lattices 16A with the corresponding long side of the second large lattices 16B to prevent the formation of the blank area. However, in a case where the stack position accuracy is slightly deteriorated, the overlaps of the straight lines have large widths (the straight lines are thickened), whereby the boundaries between the first large lattices 16A and the second large lattices 16B are highly visible, deteriorating the visibility.

In contrast, in this embodiment, the first auxiliary patterns 20A and the second auxiliary patterns 20B are stacked in the above manner, whereby the boundaries between the first large lattices 16A and the second large lattices 16B are made less visible, thereby improving the visibility.

In a case where each side of the first large lattices 16A is overlapped with the corresponding long side of the second large lattices 16B to prevent the formation of the blank area as described above, the first long side 46a to the fourth long side 46d of the second large lattices 16B are positioned right under the first side 32a to the fourth side 32d of the first large lattices 16A. In this case, all of the first side 32a to the fourth side 32d and the first long side 46a to the fourth long side 46d function as conductive portions, so that a parasitic capacitance is formed between the side of the first large lattice 16A and the long side of the second large lattice 16B, and the parasitic capacitance acts as a noise on charge information to significantly deteriorate the S/N ratio. Furthermore, since the parasitic capacitance are formed between each pair of the first large lattice 16A and the second large lattice 16B, a large number of the parasitic capacitances are connected in parallel in the first conductive patterns 26A and the second conductive patterns 26B, resulting in increase of the CR time constant. When the CR time constant is increased, there is a possibility that the waveform rise time of the voltage signal supplied to the first conductive pattern 26A (and the second conductive pattern 26B) is increased, and an electric field for the position detection is hardly generated in a predetermined scan time. In addition, there is a possibility that the waveform rise or fall time of the signal transmitted from each of the first conductive patterns 26A and the second conductive patterns 26B is increased, and the waveform change of the transmitted signal cannot be detected in a predetermined scan time. This leads to detection accuracy deterioration and response speed deterioration. Thus, in this case, the detection accuracy and the response speed can be improved only by reducing the number of the first large lattices 16A and the second large lattices 16B (lowering the resolution) or by reducing the size of the display screen, and the conductive sheet stack 12 cannot be used in a large screen such as a B5 sized, A4 sized, or larger screen.

In contrast, in this embodiment, as shown in FIG. 3A, the projected distance Lf between the side 32 of the first large lattice 16A and the long side 46 of the second large lattice 16B is approximately twice as large as the side length of the small lattice 18. Therefore, only a small parasitic capacitance is formed between the first large lattice 16A and the second large lattice 16B. As a result, the CR time constant can be reduced to improve the detection accuracy and the response speed. In the combined pattern, each corner of the first auxiliary pattern 20A may overlap with each corner of the second auxiliary pattern 20B. However, this overlap does not result in increase of the parasitic capacitance between the first large lattice 16A and the second large lattice 16B because the first auxiliary pattern 20A is unconnected with and electrically isolated from the first large lattice 16A and the second auxiliary pattern 20B is unconnected with and electrically isolated from the second large lattice 16B.

It is preferred that the optimum value of the projected distance Lf is appropriately determined depending not on the sizes of the first large lattices 16A and the second large lattices 16B but on the sizes (the line widths and the side lengths) of the small lattices 18 in the first large lattices 16A and the second large lattices 16B. When the small lattices 18 have an excessively large size as compared with the sizes of the first large lattices 16A and the second large lattices 16B, the conductive sheet stack 12 may have a high light transmittance, but the dynamic range of the transmitted signal may be reduced, causing deterioration in detection sensitivity. On the other hand, when the small lattices 18 have an excessively small size, the conductive sheet stack 12 may have a high detection sensitivity, but the light transmittance may be deteriorated under the restriction of line width reduction.

In a case where the small lattices 18 have a line width of 1 to 9 μm, the optimum value of the projected distance Lf (the optimum distance) is preferably 100 to 400 μm, more preferably 200 to 300 μm. In a case where the small lattices 18 have a smaller line width, the optimum distance can be further reduced. However, in this case, the electrical resistance may be increased, and the CR time constant may be increased even under a small parasitic capacitance, resulting in deterioration in the detection sensitivity and the response speed. Thus, the line width of the small lattice 18 is preferably within the above range.

For example, the sizes of the first large lattices 16A, the second large lattices 16B, and the small lattices 18 are determined based on the size of the display panel 110 or the size and touch position detection resolution (drive pulse period or the like) of the sensing region 112, and the optimum distance between the first large lattice 16A and the second large lattice 16B is obtained based on the line width of the small lattice 18.

When the overlap of the first connection 22A and the second connection 22B is observed from above, the connection point of the fifth medium lattice 24e and the seventh medium lattice 24g in the second connection 22B is positioned approximately at the center of the second medium lattice 24b along the first large lattice 16A, the connection point of the sixth medium lattice 24f and the eighth medium lattice 24h in the second connection 22B is positioned approximately at the center of the third medium lattice 24c along the first large lattice 16A, and the first medium lattice 24a to the eighth medium lattice 24h form a plurality of the small lattices 18 in combination. Therefore, the small lattices 18 are formed by the combination of the first connections 22A and the second connections 22B in the overlaps thereof. Thus formed small lattices 18 cannot be distinguished from the surrounding small lattices 18 in the first large lattices 16A and the second large lattices 16B, so that the visibility is improved.

In the first conductive pattern 26A and the second conductive pattern 26B, the first connection 22A and the second connection 22B overlap with each other. Several points of the thin metal wires 15 in the first connection 22A overlap with several points of the thin metal wires 15 in the second connection 22B to form a parasitic capacitance. Thus, only several points of the medium lattices 24, which are larger than the small lattices 18, overlap with each other. Therefore, the thin metal wires 15 are overlapped with each other only at the several points, and the first transparent substrate 14A has a thickness of 75 μm or more and 350 μm or less, so that only a small parasitic capacitance is formed between the first connection 22A and the second connection 22B.

When the overlap of the first insulation pattern 34A of the first insulation 28A and the second insulation pattern 34B of the second insulation 28B is observed from above, the first assembly pattern portion 36a of the first insulation pattern 34A is arranged facing the fourth space 38d of the second insulation pattern 34B, and the first space 38a of the first insulation pattern 34A is arranged facing the second assembly pattern portion 36b of the second insulation pattern 34B. Furthermore, the second space 38b of the first insulation pattern 34A is arranged facing the first bend pattern portion 48a of the second insulation pattern 34B, and the third space 38c of the first insulation pattern 34A is arranged facing the second bend pattern portion 48b of the second insulation pattern 34B. In this case, as viewed from above, the openings of the first bend pattern portion 48a are closed by the straight line shapes of the third side 32c and the fourth side 32d around the other corner 30b of the first large lattice 16A, and the openings of the second bend pattern portion 48b are closed by the straight line shapes of the first side 32a and the second side 32b around the one corner 30a of the first large lattice 16A. Therefore, the first insulation patterns 34A and the second insulation patterns 34B form a plurality of the small lattices 18 in combination. Thus formed small lattices 18 cannot be distinguished from the surrounding small lattices 18 in the first large lattices 16A and the second large lattices 16B, so that the visibility is improved.

Consequently, when the conductive sheet stack 12 is used in the projected capacitive touch panel 100 or the like, the response speed and the size of the touch panel 100 can be easily increased.

Furthermore, the combination of the first auxiliary patterns 20A formed around the first large lattices 16A in the first conductive sheet 10A and the second auxiliary patterns 20B formed around the second large lattices 16B in the second conductive sheet 10B, the combination of the first connections 22A and the second connections 22B, and the combination of the first insulation patterns 34A and the second insulation patterns 34B form a plurality of the small lattices 18. Therefore, the boundaries between the first large lattices 16A of the first conductive sheet 10A and the second large lattices 16B of the second conductive sheet 10B can be made less visible, defects such as the local line thickening can be prevented, and the overall visibility can be improved.

In addition, the CR time constant of a large number of the first conductive patterns 26A and the second conductive patterns 26B can be significantly reduced, whereby the response speed can be increased, and the position detection can be readily carried out in an operation time (a scan time). Thus, the screen sizes (not the thickness but the length and width) of the touch panel 100 can be easily increased.

In the conductive sheet stack 12, the occupation area of the thin metal wires 15 in the second conductive patterns 26B is larger than that in the first conductive patterns 26A, and thus the occupation area of the thin metal wires 15 in the second large lattices 16B (the second electrodes) is larger than that in the first large lattices 16A (the first electrodes).

In general, the second conductive patterns 26B, which are located closer to the display device 108, can act to reduce noise impact of an electromagnetic wave. Thus, a skin current flows in a particular direction to block an electric-field component of the electromagnetic wave, and an eddy current flows in a particular direction to block a magnetic-field component of the electromagnetic wave, to reduce the noise impact of the electromagnetic wave. In the conductive sheet stack 12, since the occupation area of the thin metal wires 15 in the second conductive patterns 26B, which are located closer to the display device 108, is larger than that in the first conductive patterns 26A, the second conductive patterns 26B can have a low surface resistance of 70 ohm/sq or less. Consequently, the conductive sheet stack 12 is advantageous in the reduction of the noise impact of the electromagnetic wave.

The occupation area of the thin metal wires 15 in the second large lattices 16B is larger than that in the first large lattices 16A. Therefore, in the case of using the self-capacitance technology for the finger touch position detection, though the second large lattices 16B are positioned at a longer distance from the touch position than the first large lattices 16A, the second large lattices 16B can store a large amount of signal charge in the same manner as the first large lattices 16A, and the second large lattices 16B can exhibit a detection sensitivity approximately equal to that of the first large lattices 16A. Thus, the burden of signal processing can be reduced, and the detection accuracy can be improved. In the case of using the mutual capacitance technology for the finger touch position detection, the second large lattices 16B having the larger occupation area of the thin metal wires 15 can be used as drive electrodes, the first large lattices 16A can be used as receiving electrodes, and the first large lattices 16A can exhibit a high receiving sensitivity.

Consequently, even in the case of using the patterns of the thin metal wires 15 in the electrodes, the conductive sheet stack 12 can have a high transparency, an improved S/N ratio of the detection signal, an improved detection sensitivity, and an improved detection accuracy. Furthermore, even in a case where the first conductive patterns 26A partially overlap with the second conductive patterns 26B to form a parasitic capacitance, since the first transparent substrate 14A has a thickness of 75 to 350 μm, the increase of the parasitic capacitance can be prevented, and the reduction of the detection sensitivity can be prevented.

When the thin metal wires 15 in the first conductive patterns 26A have an occupation area A1 and the thin metal wires 15 in the second conductive patterns 26B have an occupation area A2, the conductive sheet stack 12 preferably satisfies the condition of $1<A2/A1 \leq 20$, further preferably satisfies the condition of $1<A2/A1 \leq 10$, and particularly preferably satisfies the condition of $2 \leq A2/A1 \leq 10$.

When the thin metal wires 15 in the first large lattices 16A have an occupation area a1 and the thin metal wires 15 in the second large lattices 16B have an occupation area a2, the conductive sheet stack 12 preferably satisfies the condition of $1<a2/a1 \leq 20$, further preferably satisfies the condition of $1<a2/a1 \leq 10$, and particularly preferably satisfies the condition of $2 \leq a2/a1 \leq 10$.

Though the first large lattice 16A has a tetragonal shape shown in FIG. 4 and the second large lattice 16B has an octagonal shape shown in FIG. 5 in the above example, the shapes of the first large lattice 16A and the second large lattice 16B are not limited to the example. Also the sizes of the first large lattice 16A and the second large lattice 16B are not limited as long as they can satisfactorily detect the touch position.

Though the small lattice 18 has a square shape in the above example, it may have another polygonal shape. Each side of the small lattice 18 may have a straight line shape, a curved shape, or an arc shape. When the small lattice 18 has an arc-shaped side, for example, two opposite sides may have an outwardly protruding arc shape, and the other two opposite sides may have an inwardly protruding arc shape. Alternatively, each side may have a wavy shape containing outwardly protruding arcs and inwardly protruding arcs continuously. Of course, each side may have a sine curve shape.

Though the arrangement pitch of the medium lattices 24 in the first connections 22A and the second connections 22B is twice larger than the arrangement pitch P of the small lattices 18 in the above first conductive sheet 10A and second conductive sheet 10B, it may be appropriately selected depending on the number of the medium lattices 24. For example, the arrangement pitch of the medium lattices 24 may be 1.5 or 3 times larger than the arrangement pitch P. When the arrangement pitch of the medium lattices 24 is excessively small or large, it may be difficult to arrange the first large lattices 16A and the second large lattices 16B, resulting in poor appearance. Thus, the arrangement pitch of the medium lattices 24 is preferably 1 to 10 times, more preferably 1 to 5 times, larger than the arrangement pitch P of the small lattices 18.

Also the sizes of the small lattices 18 (including the side length and the diagonal line length), the number of the small lattices 18 in the first large lattice 16A, and the number of the small lattices 18 in the second large lattice 16B may be appropriately selected depending on the size and the resolution (the line number) of the touch panel 100.

Several variant examples of the first conductive part 13A and the second conductive part 13B will be described below with reference to FIGS. 7 to 15.

Figure 7:
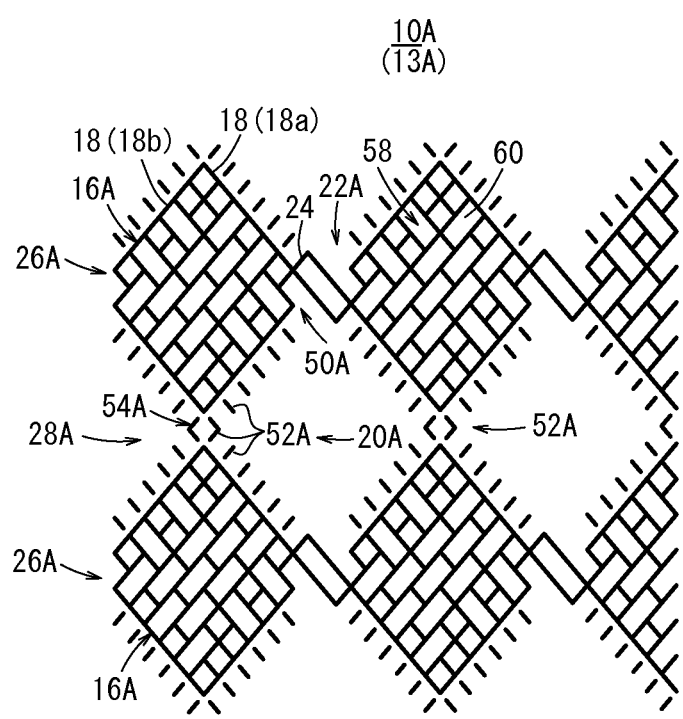
FIG. 7 is a plan view of a pattern example of a first conductive part according to a first variant example.
Figure 7:
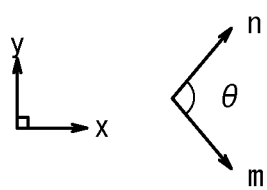

As shown in FIG. 7, a first conductive part 13A according to a first variant example contains two or more first conductive patterns 26A and first auxiliary patterns 20A. The first conductive patterns 26A extend in the first direction (the x direction), are arranged in the second direction (the y direction), each contain a large number of the small lattices 18, and are composed of the thin metal wires 15. The first auxiliary patterns 20A are arranged around the first conductive patterns 26A and are composed of the thin metal wires 15.

The first conductive pattern 26A contains two or more first large lattices 16A. The first large lattices 16A are connected in series in the first direction (the x direction), and each contain a combination of two or more small lattices 18. The above first auxiliary pattern 20A is formed around a side of the first large lattice 16A and is not connected to the first large lattice 16A.

First connections 22A composed of the thin metal wires 15 are formed between the first large lattices 16A, and each adjacent two of the first large lattices 16A are electrically connected by the first connection 22A. The first connection 22A contains a medium lattice 24, and the size of the medium lattice 24 corresponds to the total size of p small lattices 18 (in which p is a real number larger than 1) arranged in a third direction (an m direction). A first absent portion 50A (a portion provided by removing one side from the small lattice 18) is formed between the medium lattice 24 and a side of the first large lattice 16A extending along a fourth direction (an n direction). The angle θ between the third direction and the fourth direction may be appropriately selected within a range of 60° to 120°.

An electrically isolated first insulation 28A is disposed between the adjacent first conductive patterns 26A.

The first auxiliary pattern 20A contains a plurality of first auxiliary wires 52A (having an axis direction parallel to the fourth direction) arranged along the side of the first large lattice 16A parallel to the third direction (the m direction), a plurality of first auxiliary wires 52A (having an axis direction parallel to the third direction) arranged along the side of the first large lattice 16A parallel to the fourth direction, and two L-shaped patterns 54A arranged facing each other. Each of the L-shaped patterns 54A is formed by combining two first auxiliary wires 52A into an L shape in the first insulation 28A. The first auxiliary wires 52A and the L-shaped patterns 54A may have a smaller length in the longitudinal direction and thus a dot shape.

Figure 8:
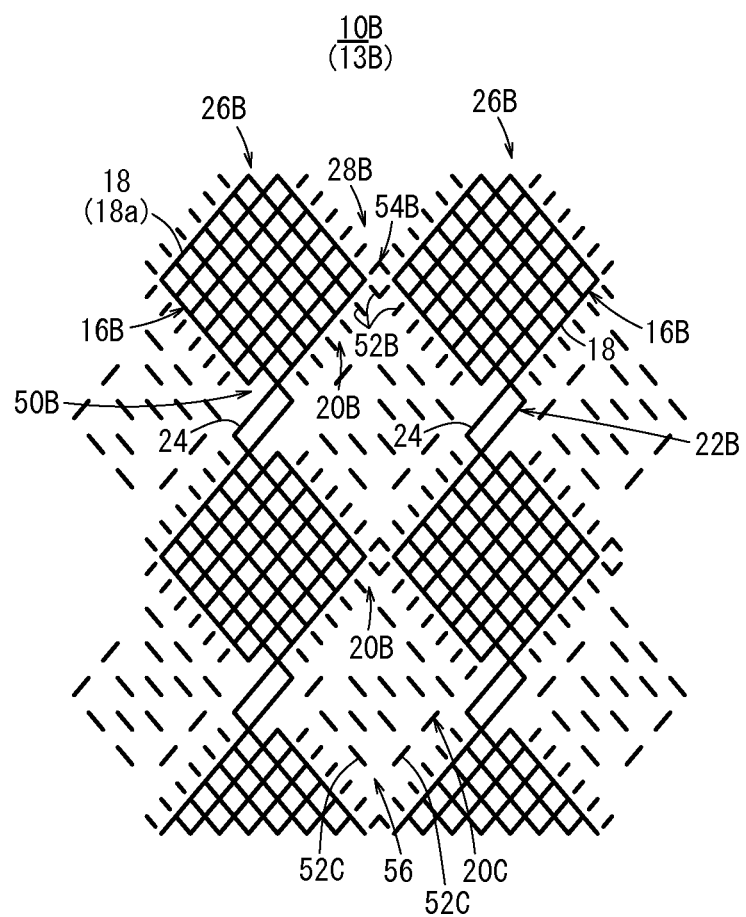
FIG. 8 is a plan view of a pattern example of a second conductive part according to the first variant example.
Figure 8:
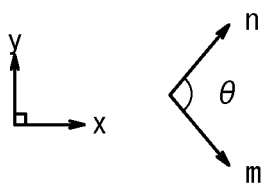

On the other hand, as shown in FIG. 8, a second conductive part 13B according to the example contains two or more second conductive patterns 26B and second auxiliary patterns 20B. The second conductive patterns 26B extend in the second direction (the y direction), are arranged in the first direction (the x direction) perpendicular to the second direction, each contain a large number of the small lattices 18, and are composed of the thin metal wires 15. The second auxiliary patterns 20B are arranged around the second conductive patterns 26B and are composed of the thin metal wires 15.

The second conductive pattern 26B contains two or more second large lattices 16B. The second large lattices 16B are connected in series in the second direction, and each contain a combination of two or more small lattices 18. The above second auxiliary pattern 20B is formed around a side of the second large lattice 16B and is not connected to the second large lattice 16B.

As shown in FIG. 8, second connections 22B composed of the thin metal wires 15 are formed between the second large lattices 16B, and each adjacent two of the second large lattices 16B are electrically connected by the second connection 22B. The second connection 22B contains a medium lattice 24, and the size of the medium lattice 24 corresponds to the total size of p small lattices 18 (in which p is a real number larger than 1) arranged in the fourth direction (the n direction). A second absent portion 50B (a portion provided by removing one side from the small lattice 18) is formed between the medium lattice 24 and a side of the second large lattice 16B extending along the third direction (the m direction). In the example of FIG. 8, the size of the medium lattice 24 corresponds to the total size of three small lattices 18 arranged in the fourth direction. Further, the second conductive part 13B contains third auxiliary patterns 20C composed of the thin metal wires 15 (additional auxiliary electrodes) in blank areas 56 (light-transmitting areas) between the second large lattices 16B. The blank area 56 has a size approximately equal to the first large lattice 16A.

An electrically isolated second insulation 28B is disposed between the adjacent second conductive patterns 26B.

The second auxiliary pattern 20B contains a plurality of second auxiliary wires 52B (having an axis direction parallel to the fourth direction) arranged along the side of the second large lattice 16B parallel to the third direction, a plurality of second auxiliary wires 52B (having an axis direction parallel to the third direction) arranged along the side of the second large lattice 16B parallel to the fourth direction, and two L-shaped patterns 54B arranged facing each other. Each of the L-shaped patterns 54B is formed by combining two second auxiliary wires 52B into an L shape in the second insulation 28B. The second auxiliary wires 52B and the L-shaped patterns 54B may have a smaller length in the longitudinal direction and thus a dot shape.

The third auxiliary pattern 20C contains the third auxiliary wire 52C having an axis direction parallel to the third direction and/or the third auxiliary wire 52C having an axis direction parallel to the fourth direction. Of course, the third auxiliary pattern 20C may contain an L-shaped pattern formed by combining two third auxiliary wires 52C into an L shape. The third auxiliary wires 52C and the L-shaped patterns may have a smaller length in the longitudinal direction and thus a dot shape.

As shown in FIG. 7, in the first large lattices 16A of the first conductive part 13A, absent patterns 58 (blank patterns containing no thin metal wires 15) are formed in positions corresponding to the third auxiliary patterns 20C in the second conductive part 13B (see FIG. 8). When the first conductive sheet 10A is stacked on the second conductive sheet 10B, the blank area 56 in the second large lattice 16B overlaps with the first large lattice 16A as hereinafter described. The blank area 56 has the third auxiliary pattern 20C, and the first large lattice 16A has the absent pattern 58 corresponding to the third auxiliary pattern 20C in the position corresponding to the overlap. The absent pattern 58 has an absent portion 60 (provided by removing the thin metal wire 15), and the size of the absent portion 60 corresponds to that of the third auxiliary wire 52C in the third auxiliary pattern 20C. Thus, the absent portion 60 having a size approximately equal to that of the third auxiliary wire 52C is formed in the position corresponding to the overlap of the third auxiliary wire 52C. Of course, in a case where the third auxiliary pattern 20C contains the L-shaped pattern, another absent portion 60 having a size approximately equal to that of the L-shaped pattern is formed in the position corresponding to the overlap of the L-shaped pattern.

The small lattices 18 in the first large lattice 16A include first small lattices 18a having sizes equal to those of the small lattices 18 in the second large lattice 16B and second small lattices 18b having sizes larger than those of the first small lattices 18a. In FIG. 7, the second small lattice 18b has a first shape formed by arranging two first small lattices 18a in the third direction or a second shape formed by arranging two first small lattices 18a in the fourth direction. The second small lattice 18b is not limited to the shapes. The second small lattice 18b has a length component (such as a side), which is s times longer than the side length of the first small lattice 18a (in which s is a real number larger than 1). For example, the length component may be 1.5, 2.5, or 3 times longer than the side length of the first small lattice 18a. As well as the second small lattice 18b, also the third auxiliary wire 52C in the third auxiliary pattern 20C may be s times longer than the side length of the first small lattice 18a (in which s is a real number larger than 1).

The line width of each of the first auxiliary patterns 20A (the first auxiliary wires 52A), the second auxiliary patterns 20B (the second auxiliary wires 52B), and the third auxiliary patterns 20C (the third auxiliary wires 52C) may be 30 μm or less, and may be equal to or different from those of the first conductive patterns 26A and the second conductive patterns 26B. It is preferred that the first conductive patterns 26A, the second conductive patterns 26B, the first auxiliary patterns 20A, the second auxiliary patterns 20B, and the third auxiliary patterns 20C have the same line width.

Figure 9:
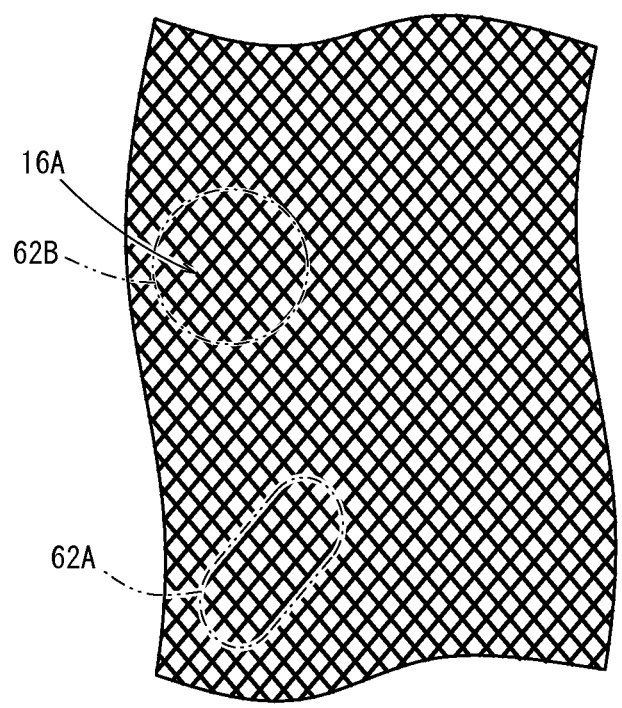
FIG. 9 is a partially omitted, plan view of a conductive sheet stack formed by combining a first conductive sheet having the first conductive part of the first variant example and a second conductive sheet having the second conductive part of the first variant example.

For example, as shown in FIG. 9, when the first conductive sheet 10A is stacked on the second conductive sheet 10B to form the conductive sheet stack 12, the first conductive patterns 26A and the second conductive patterns 26B are crossed. Specifically, the first connections 22A of the first conductive patterns 26A and the second connections 22B of the second conductive patterns 26B are arranged facing each other with the first transparent substrate 14A (see FIG. 3A) interposed therebetween, and also the first insulations 28A of the first conductive part 13A and the second insulations 28B of the second conductive part 13B are arranged facing each other with the first transparent substrate 14A interposed therebetween.

As shown in FIG. 9, when the conductive sheet stack 12 is observed from above, the spaces between the first large lattices 16A of the first conductive sheet 10A are filled with the second large lattices 16B of the second conductive sheet 10B. In this case, the first auxiliary patterns 20A and the second auxiliary patterns 20B overlap with each other to form first combined patterns 62A (auxiliary electrodes) between the first large lattices 16A and the second large lattices 16B, and the third auxiliary patterns 20C (the additional auxiliary electrodes) formed in the blank areas 56 between the second large lattices 16B overlap with the absent patterns 58 in the first large lattices 16A to form second combined patterns 62B.

Figure 10:
FIG. 10 is an explanatory view of one line formed by first and second auxiliary wires.

As shown in FIG. 10, in the first combined pattern 62A, an axis 64A of the first auxiliary wire 52A corresponds to an axis 64B of the second auxiliary wire 52B, the first auxiliary wire 52A does not overlap with the second auxiliary wire 52B, and an end of the first auxiliary wire 52A corresponds to an end of the second auxiliary wire 52B, whereby one side of the small lattice 18 is formed. Therefore, the first combined pattern 62A contains a combination of two or more small lattices 18. In the second combined pattern 62B, the absent portion 60 of the absent pattern 58 in the first large lattice 16A is compensated by the third auxiliary wire 52C in the third auxiliary pattern 20C. Therefore, the second combined pattern 62B contains a combination of two or more small lattices 18. Consequently, as shown in FIG. 9, when the conductive sheet stack 12 is observed from above, the entire surface is covered with a large number of the small lattices 18, and the boundaries between the first large lattices 16A and the second large lattices 16B can hardly be found.

In a case where the absent patterns 58 are not formed in the first large lattice 16A, the light transmittance difference between a portion corresponding to the first large lattice 16A and a portion corresponding to the second large lattice 16B is increased in the conductive sheet stack 12, deteriorating the visibility (making the first large lattice 16A or the second large lattice 16B highly visible). Thus, in this embodiment, the absent patterns 58 are formed in the first large lattice 16A, whereby the portions corresponding to the first large lattice 16A and the second large lattice 16B have uniform light transmittance to improve the visibility.

Though, in the absent pattern 58 of the first large lattice 16A, the absent portion 60 having a size approximately equal to that of the third auxiliary wire 52C is formed in the position corresponding to the overlap of the third auxiliary wire 52C in the above example, the absent portion 60 is not limited to this example. The absent portion 60 may be formed in a position different from the position corresponding to the overlap of the third auxiliary wire 52C, as long as the portions corresponding to the first large lattice 16A and the second large lattice 16B have uniform light transmittance.

In a case where the number of the third auxiliary wires 52C is increased in the third auxiliary pattern 20C, it is necessary to increase the number of the absent portions 60 in the first large lattice 16A in view of achieving the above uniform light transmittance. In this case, there is a possibility that the conductivity of the first large lattice 16A is deteriorated. Accordingly, the occupation area of the thin metal wires in the third auxiliary patterns 20C is preferably ½ or less, further preferably ¼ or less, of the occupation area of the thin metal wires in the second large lattices 16B.

When the thin metal wires 15 in the first conductive patterns 26A have an occupation area A1 and the thin metal wires 15 in the second conductive patterns 26B have an occupation area A2, also the conductive sheet stack 12 of the first variant example preferably satisfies the condition of 1<A2/A1≤20, further preferably satisfies the condition of 1<A2/A1≤10, and particularly preferably satisfies the condition of 2≤A2/A1≤10.

When the thin metal wires 15 in the first large lattices 16A have an occupation area a1 and the thin metal wires 15 in the second large lattices 16B have an occupation area a2, also the conductive sheet stack 12 of the first variant example preferably satisfies the condition of 1<a2/a1≤20, further preferably satisfies the condition of 1<a2/a1≤10, and particularly preferably satisfies the condition of 2≤a2/a1≤10.

In the first variant example, the third auxiliary patterns 20C are formed in the blank areas 56 between the second large lattices 16B in the second conductive patterns 26B. Therefore, the occupation area of the thin metal wires 15 in the second conductive patterns 26B can be significantly larger than that in the first conductive patterns 26A, and the second conductive patterns 26B can more effectively act to reduce the noise impact of the electromagnetic wave from the display device 108 or the like.

Consequently, even in the case of using the patterns of the thin metal wires 15 in the electrodes, the conductive sheet stack 12 can have a high transparency, an improved S/N ratio of the detection signal, an improved detection sensitivity, and an improved detection accuracy.

Figure 11:
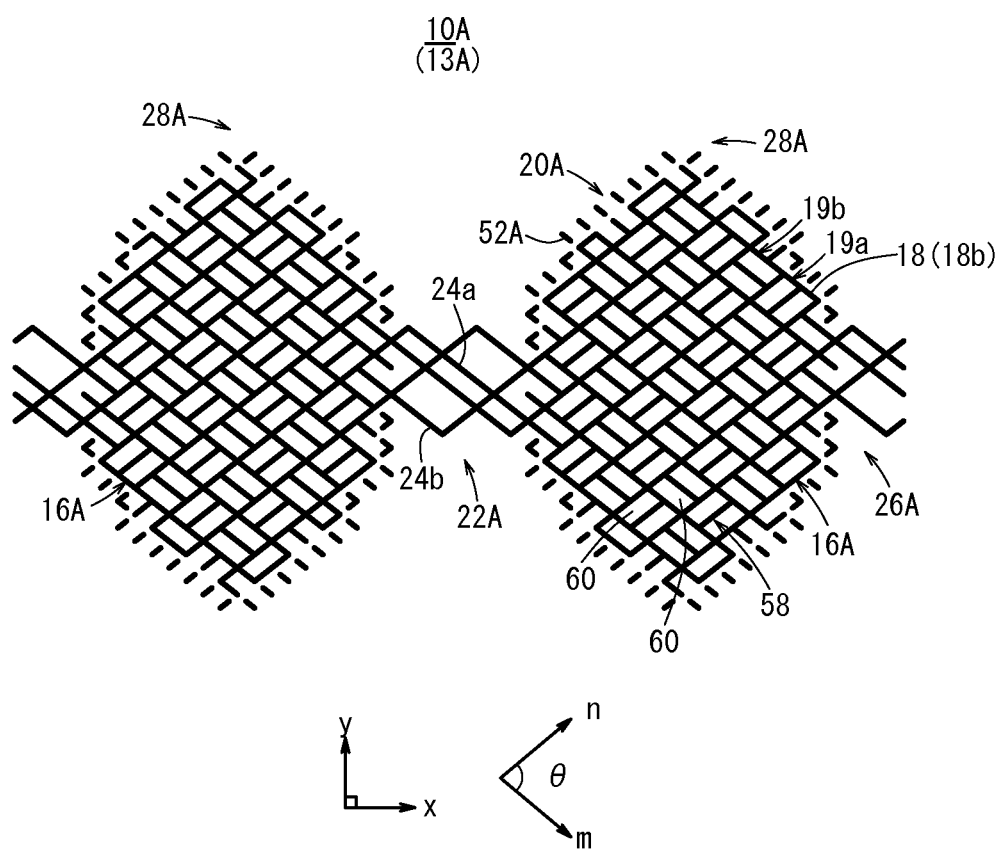
FIG. 11 is a plan view of a pattern example of a first conductive part according to a second variant example.

As shown in FIG. 11, a first conductive part 13A according to a second variant example contains two or more first large lattices 16A connected in series in the first direction (the x direction). First auxiliary patterns 20A are formed around the sides of the first large lattices 16A, and are not connected to the first large lattices 16A. First connections 22A composed of the thin metal wires 15 are formed between the first large lattices 16A, and each adjacent two of the first large lattices 16A are electrically connected by the first connection 22A.

The first connection 22A contains a first medium lattice 24a and a second medium lattice 24b. The size of the first medium lattice 24a corresponds to the total size of p first small lattices 18a (in which p is a real number larger than 1) arranged in the third direction (the m direction). The size of the second medium lattice 24b corresponds to the total size of q first small lattices 18a (in which q is a real number larger than 1) arranged in the third direction (the m direction), and r first small lattices 18a (in which r is a real number larger than 1) arranged in the fourth direction (the n direction). The second medium lattice 24b is crossed with the first medium lattice 24a. In the example of FIG. 11, the size of the first medium lattice 24a corresponds to the total size of seven first small lattices 18a arranged in the third direction, and the second medium lattice 24b is such that three first small lattices 18a are arranged in the third direction and five first small lattices 18a are arranged in the fourth direction. The angle θ between the third direction and the fourth direction may be appropriately selected within a range of 60° to 120°.

The first auxiliary pattern 20A contains a plurality of first auxiliary wires 52A, L-shaped patterns, etc.

Figure 12:
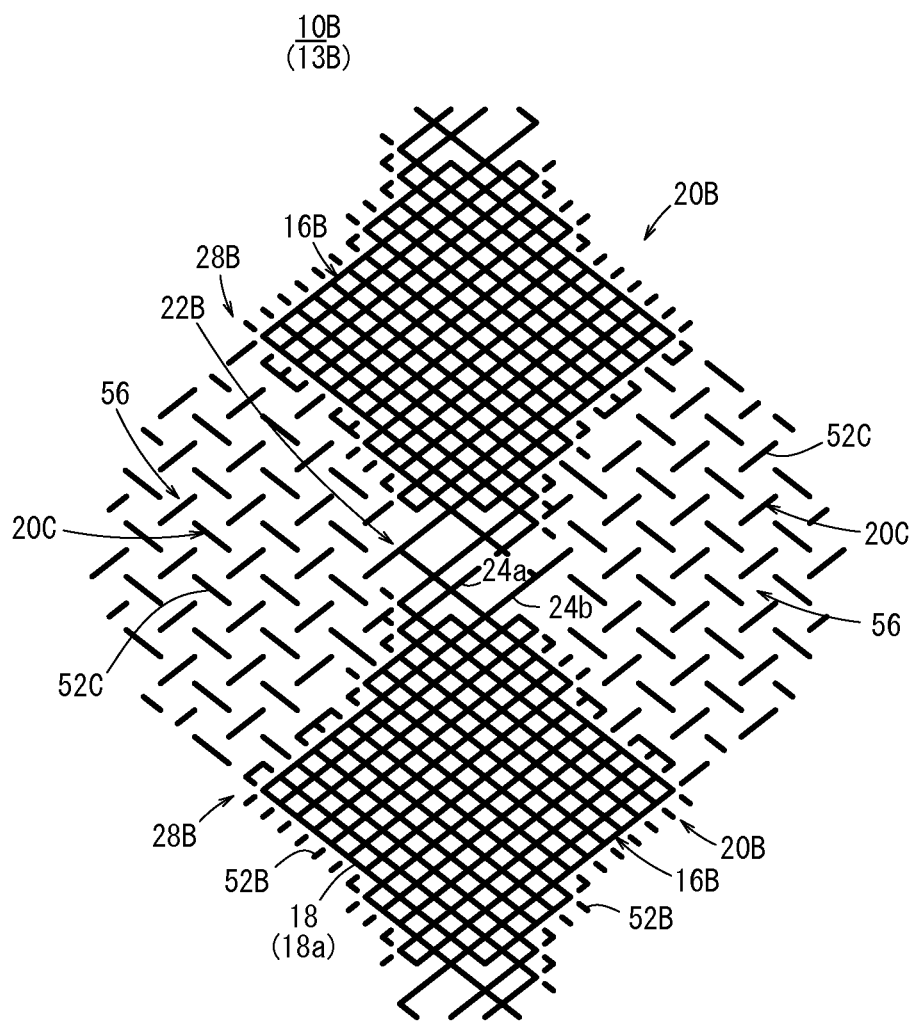
FIG. 12 is a plan view of a pattern example of a second conductive part according to the second variant example.

On the other hand, as shown in FIG. 12, a second conductive part 13B according to the second variant example contains two or more second large lattices 16B connected in series in the second direction (the y direction). The second large lattices 16B each contain a combination of two or more small lattices 18. Second auxiliary patterns 20B are formed around the sides of the second large lattices 16B, and are not connected to the second large lattices 16B. The second auxiliary patterns 20B contain a plurality of second auxiliary wires 52B, L-shaped patterns, and U- and E-shaped patterns provided by combining the second auxiliary wire 52B and the thin metal wire corresponding to one side of the small lattice 18.

Second connections 22B composed of the thin metal wires 15 are formed between the second large lattices 16B, and each adjacent two of the second large lattices 16B are electrically connected by the second connection 22B. The second connection 22B contains a first medium lattice 24a and a second medium lattice 24b. The size of the first medium lattice 24a corresponds to the total size of p small lattices 18 (in which p is a real number larger than 1) arranged in the fourth direction (the n direction). The size of the second medium lattice 24b corresponds to the total size of q small lattices 18 (in which q is a real number larger than 1) arranged in the fourth direction (the n direction), and r small lattices 18 (in which r is a real number larger than 1) arranged in the third direction (the m direction). The second medium lattice 24b is crossed with the first medium lattice 24a. In the example of FIG. 12, the size of the first medium lattice 24a corresponds to the total size of seven first small lattices 18a arranged in the fourth direction, and the second medium lattice 24b is arranged such that three first small lattices 18a are arranged in the fourth direction and five first small lattices 18a are arranged in the third direction. Furthermore, in a second conductive pattern 26B, third auxiliary patterns 20C composed of the thin metal wires 15 are formed in blank areas 56 (light-transmitting areas) between the second large lattices 16B.

In the third auxiliary pattern 20C formed in the blank area 56 between the second large lattices 16B, third auxiliary wires 52C having an axis direction parallel to the third direction (the m direction) and third auxiliary wires 52C having an axis direction parallel to the fourth direction (the n direction) are alternately arranged, and the third auxiliary wires 52C are electrically isolated from each other (e.g. arranged at a distance corresponding to the side length of the small lattice 18).

As shown in FIG. 11, in the first large lattices 16A, absent patterns 58 (blank patterns containing no thin metal wires 15) are formed in positions corresponding to the third auxiliary patterns 20C adjacent to the second conductive patterns 26B (see FIG. 12). The absent pattern 58 has an absent portion 60 corresponding to the third auxiliary wire 52C in the third auxiliary pattern 20C (provided by removing the thin metal wire 15). Thus, the absent portion 60 having a size approximately equal to that of the third auxiliary wire 52C is formed in the position corresponding to the overlap of the third auxiliary wire 52C.

The first large lattice 16A is mainly composed of a plurality of second small lattices 18b having sizes larger than those of the first small lattices 18a. In FIG. 11, the second small lattice 18b has a first shape formed by arranging two first small lattices 18a in the fourth direction or a second shape formed by arranging two first small lattices 18a in the third direction. The second small lattice 18b is not limited to the shapes. The second small lattice 18b has a length component (such as a side), which is s times longer than the side length of the first small lattice 18a (in which s is a real number larger than 1). For example, the length component may be 1.5, 2.5, or 3 times longer than the side length of the first small lattice 18a. As well as the second small lattices 18b, also the third auxiliary wire 52C in the third auxiliary pattern 20C may be s times longer than the side length of the first small lattice 18a (in which s is a real number larger than 1).

In the first large lattice 16A, first combined shapes 19a, which each contain a combination of two first shapes arranged in the third direction, and second combined shapes 19b, which each contain a combination of two second shapes arranged in the fourth direction, are alternately arranged.

When the first conductive sheet 10A is stacked on the second conductive sheet 10B, the thin metal wire between the adjacent first shapes (extending in the fourth direction) intersects with the third auxiliary wire 52C extending in the third direction, and the thin metal wire between the adjacent second shapes (extending in the third direction) intersects with the third auxiliary wire 52C extending in the fourth direction.

Figure 13:
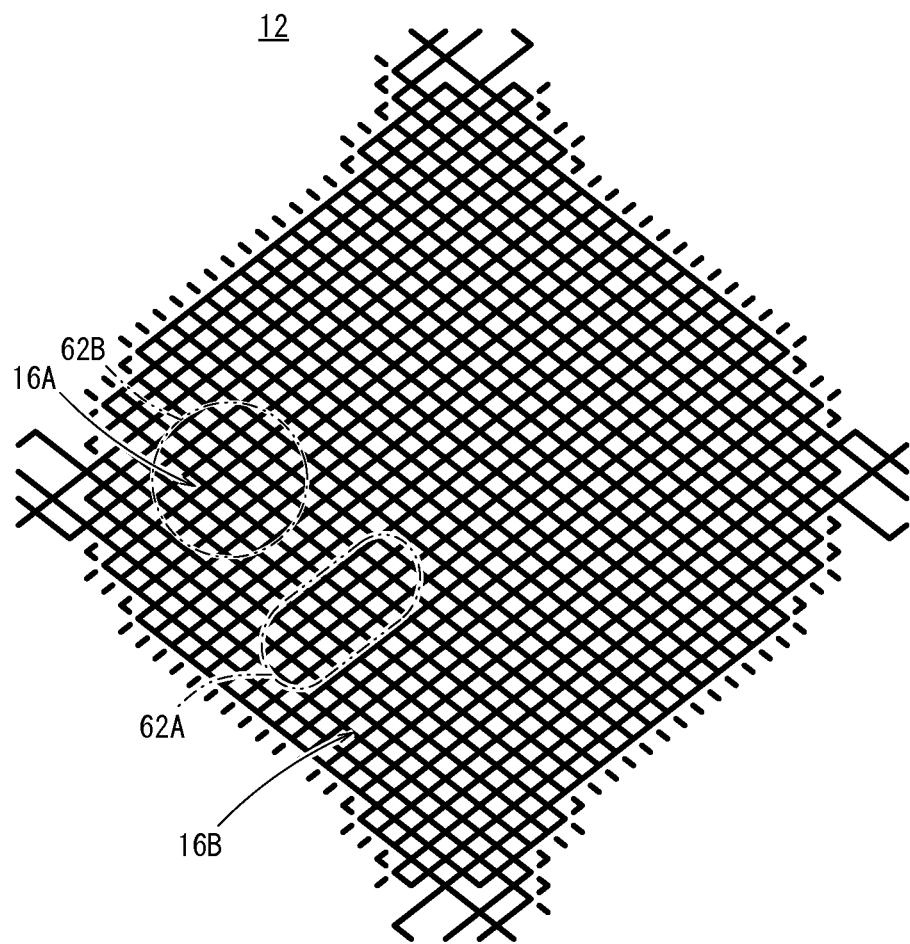
FIG. 13 is a partially omitted, plan view of a conductive sheet stack formed by combining a first conductive sheet having the first conductive part of the second variant example and a second conductive sheet having the second conductive part of the second variant example.

Therefore, as shown in FIG. 13, the first auxiliary patterns 20A and the second auxiliary patterns 20B overlap with each other to form first combined patterns 62A, and each first combined pattern 62A contains a combination of two or more small lattices 18.

Furthermore, the third auxiliary patterns 20C formed in the blank areas 56 between the second large lattices 16B overlap with the absent patterns 58 in the first large lattices 16A to form second combined patterns 62B. In the second combined pattern 62B, the absent portion 60 of the absent pattern 58 in the first large lattice 16A is compensated by the third auxiliary wire 52C in the third auxiliary pattern 20C. Therefore, the second combined pattern 62B contains a combination of two or more small lattices 18. Consequently, as shown in FIG. 13, when the conductive sheet stack 12 is observed from above, the entire surface is covered with a large number of the small lattices 18, and the boundaries between the first large lattices 16A and the second large lattices 16B can hardly be found.

A first conductive part 13A and a second conductive part 13B according to a third variant example have approximately the same structures as those of the second variant example, but are different in the patterns of the first large lattices 16A and the third auxiliary patterns 20C in the blank areas 56 between the second large lattices 16B, as described below.

Figure 15:
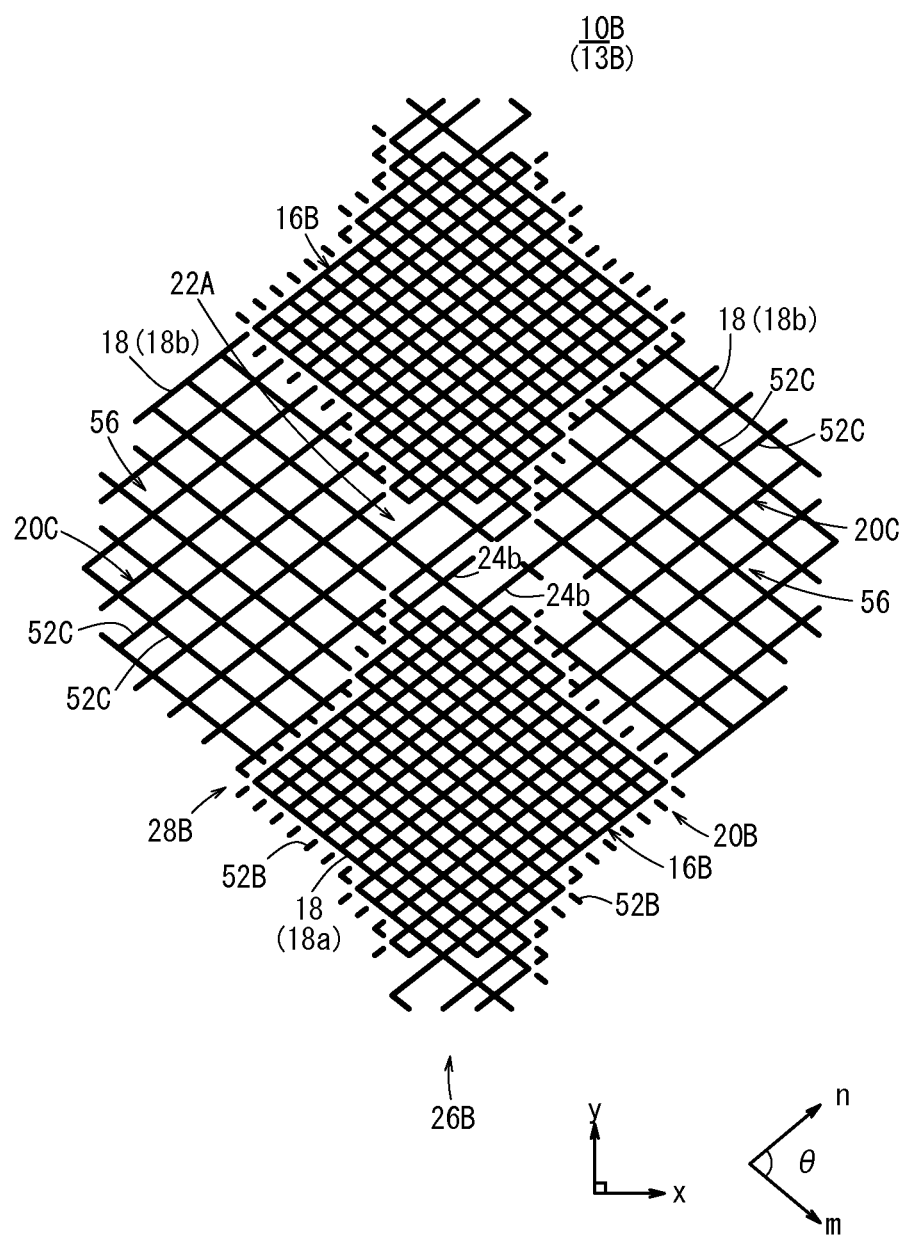
FIG. 15 is a plan view of a pattern example of a second conductive part according to the third variant example.

The third auxiliary pattern 20C will be described below. As shown in FIG. 15, in the third auxiliary pattern 20C, a plurality of third auxiliary wires 52C, which have an axis direction parallel to the third direction (the m direction) and are arranged in the fourth direction, intersect with a plurality of third auxiliary wires 52C, which have an axis direction parallel to the fourth direction (the n direction) and are arranged in the third direction. Thus, the third auxiliary pattern 20C contains a combination of a plurality of second small lattices 18b, and the second small lattice 18b is sized such that two first small lattices 18a are arranged in the third direction and two first small lattices 18a are arranged in the fourth direction.

Figure 14:
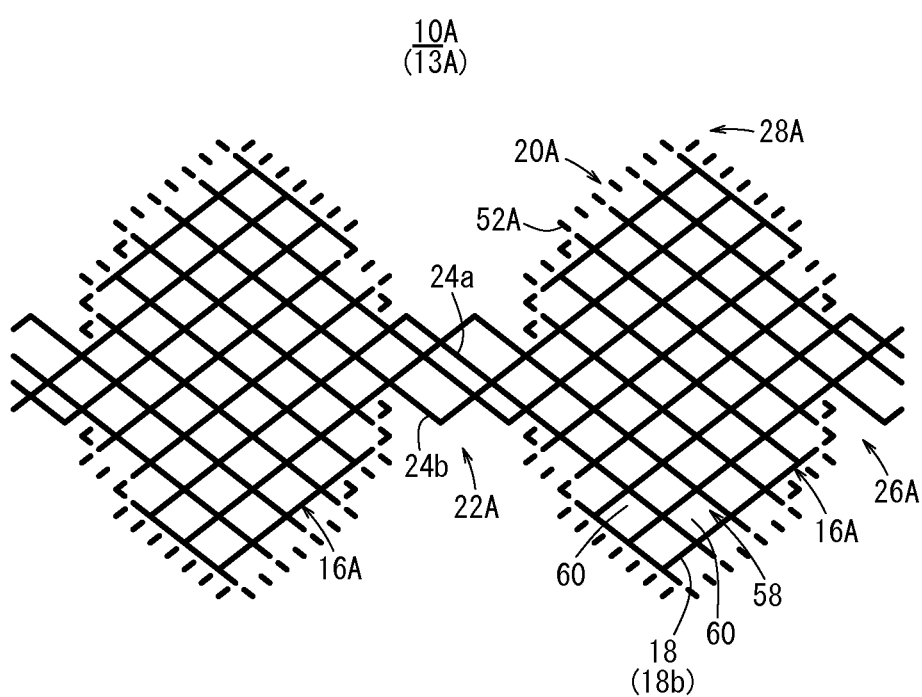
FIG. 14 is a plan view of a pattern example of a first conductive part according to a third variant example.

As shown in FIG. 14, absent patterns 58 corresponding to the third auxiliary patterns 20C (see FIG. 15) are formed in the first large lattices 16A. The absent pattern 58 has an absent portion 60 in a position facing an intersection of the third auxiliary wires 52C in the third auxiliary pattern 20C, and the absent portion 60 has a size approximately equal to that of the second small lattice 18b. Thus, the first large lattice 16A contains a combination of the second small lattices 18b, and the size of the second small lattice 18b in the first large lattice 16A is equal to that of the second small lattice 18b in the third auxiliary pattern 20C. The position relation between the first large lattice 16A and the third auxiliary pattern 20C is such that the second small lattices 18b in the first large lattice 16A are displaced in each of the third and fourth directions by a distance corresponding to the side length of the first small lattice 18a from the second small lattices 18b in the third auxiliary pattern 20C.

Therefore, also in the third variant example, as shown in FIG. 13, the first auxiliary patterns 20A and the second auxiliary patterns 20B overlap with each other to form the first combined patterns 62A, and each first combined pattern 62A contains a combination of two or more small lattices 18.

Furthermore, the third auxiliary patterns 20C formed in the blank areas 56 between the second large lattices 16B overlap with the absent patterns 58 in the first large lattices 16A to form second combined patterns 62B. In the second combined pattern 62B, the absent portion 60 of the absent pattern 58 in the first large lattice 16A is compensated by the third auxiliary wire 52C in the third auxiliary pattern 20C. Therefore, the second combined pattern 62B contains a combination of two or more small lattices 18. Consequently, as shown in FIG. 13, when the conductive sheet stack 12 is observed from above, the entire surface is covered with a large number of the small lattices 18, and the boundaries between the first large lattices 16A and the second large lattices 16B can hardly be found.

Though the first conductive sheet 10A and the second conductive sheet 10B are used in the projected capacitive touch panel 100 in the above embodiment, they may be used in a surface capacitive touch panel or a resistive touch panel.

Figure 3B:
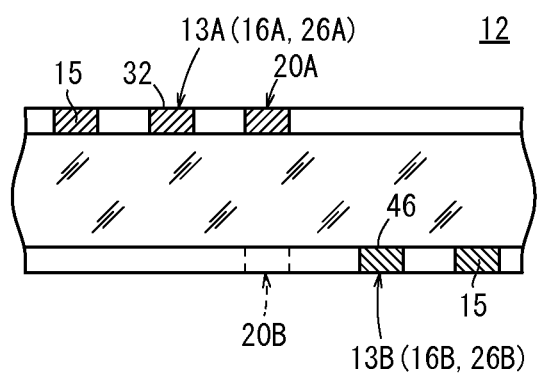
FIG. 3B is a partially omitted, cross-sectional view of another example of the conductive sheet stack.

In the above conductive sheet stack 12, as shown in FIGS. 2 and 3A, the first conductive part 13A is formed on the one main surface of the first transparent substrate 14A, the second conductive part 13B is formed on the one main surface of the second transparent substrate 14B, and they are stacked. Alternatively, as shown in FIG. 3B, the first conductive part 13A may be formed on the one main surface of the first transparent substrate 14A, and the second conductive part 13B may be formed on the other main surface of the first transparent substrate 14A. In this case, the second transparent substrate 14B is not used, the first transparent substrate 14A is stacked on the second conductive part 13B, and the first conductive part 13A is stacked on the first transparent substrate 14A. In addition, another layer may be disposed between the first conductive sheet 10A and the second conductive sheet 10B. The first conductive part 13A and the second conductive part 13B may be arranged facing each other as long as they are insulated.

The first conductive part 13A and the second conductive part 13B may be formed as follows. For example, a photosensitive material having the first transparent substrate 14A or the second transparent substrate 14B and thereon a photosensitive silver halide-containing emulsion layer may be exposed and developed, whereby metallic silver portions and light-transmitting portions may be formed in the exposed areas and the unexposed areas respectively to obtain the first conductive part 13A and the second conductive part 13B. The metallic silver portions may be subjected to a physical development treatment and/or a plating treatment to deposit a conductive metal on the metallic silver portions.

As shown in FIG. 3B, the first conductive part 13A may be formed on the one main surface of the first transparent substrate 14A, and the second conductive part 13B may be formed on the other main surface thereof. In this case, if the one main surface is exposed and then the other main surface is exposed in the usual method, the desired patterns cannot be obtained on the first conductive part 13A and the second conductive part 13B occasionally. In particular, it is difficult to uniformly form the first auxiliary patterns 20A around the sides 32 of the first large lattices 16A and the first insulation patterns 34A in the first insulations 28A shown in FIG. 4, the second auxiliary patterns 20B around the long sides 46 of the second large lattices 16B and the second insulation patterns 34B in the second insulations 28B shown in FIG. 5, etc.

Therefore, the following production method can be preferably used.

Thus, the first conductive part 13A on the one main surface and the second conductive part 13B on the other main surface are formed by subjecting the photosensitive silver halide emulsion layers on both sides of the first transparent substrate 14A to one-shot exposure.

A specific example of the production method will be described below with reference to FIGS. 16 to 18.

Figure 16:
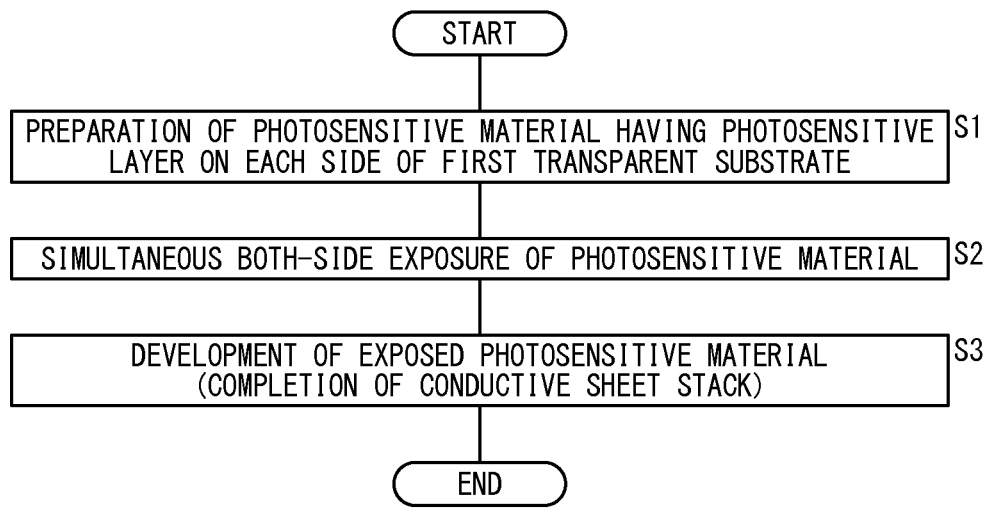
FIG. 16 is a flow chart of a method for producing the conductive sheet stack of this embodiment.
Figure 17A:
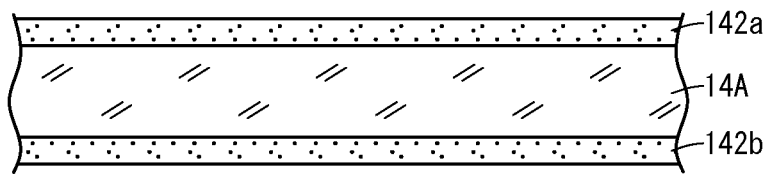
FIG. 17A is a partially omitted, cross-sectional view of a produced photosensitive material.

First, in step S1 of FIG. 16, a long photosensitive material 140 is prepared. As shown in FIG. 17A, the photosensitive material 140 has the first transparent substrate 14A, a photosensitive silver halide emulsion layer formed on one main surface of the first transparent substrate 14A (hereinafter referred to as the first photosensitive layer 142*a*), and a photosensitive silver halide emulsion layer formed on the other main surface of the first transparent substrate 14A (hereinafter referred to as the second photosensitive layer 142*b*).

Figure 17B:
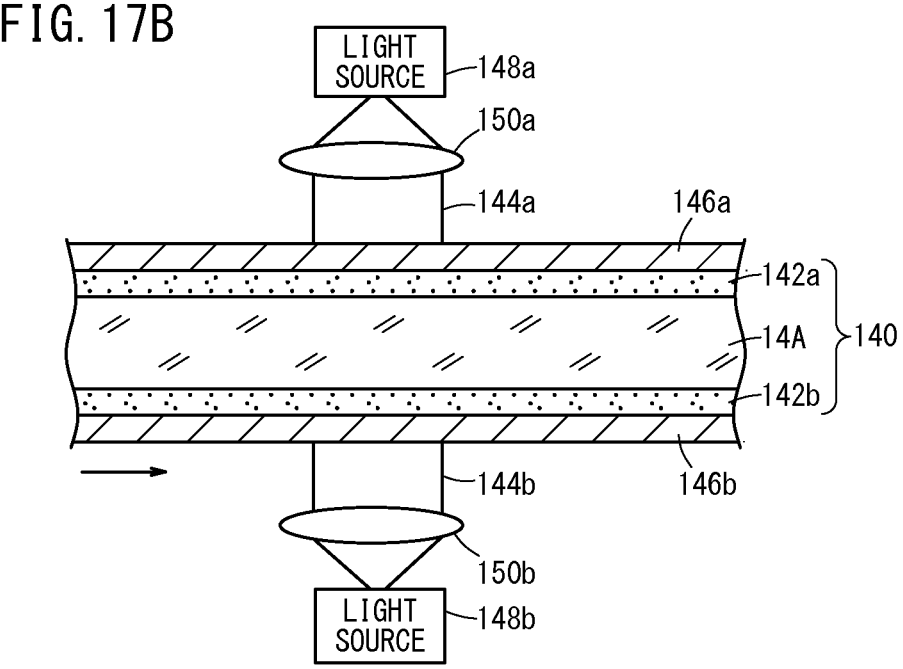
FIG. 17B is an explanatory view for illustrating simultaneous both-side exposure of the photosensitive material.

In step S2 of FIG. 16, the photosensitive material 140 is exposed. In this exposure step, a simultaneous both-side exposure, which includes a first exposure treatment for irradiating the first photosensitive layer 142*a* on the first transparent substrate 14A with a light in a first exposure pattern and a second exposure treatment for irradiating the second photosensitive layer 142*b* on the first transparent substrate 14A with a light in a second exposure pattern, is carried out. In the example of FIG. 17B, the first photosensitive layer 142*a* is irradiated through a first photomask 146*a* with a first light 144*a* (a parallel light), and the second photosensitive layer 142*b* is irradiated through a second photomask 146*b* with a second light 144*b* (a parallel light), while conveying the long photosensitive material 140 in one direction. The first light 144*a* is obtained such that a light from a first light source 148*a* is converted to the parallel light by an intermediate first collimator lens 150*a*, and the second light 144*b* is obtained such that a light from a second light source 148*b* is converted to the parallel light by an intermediate second collimator lens 150*b*. Though two light sources (the first light source 148*a* and the second light source 148*b*) are used in the example of FIG. 17B, only one light source may be used. In this case, a light from the one light source may be divided by an optical system into the first light 144*a* and the second light 144*b* for exposing the first photosensitive layer 142*a* and the second photosensitive layer 142*b*.

In the step S3 of FIG. 16, the exposed photosensitive material 140 is developed to prepare e.g. the conductive sheet stack 12 shown in FIG. 3B. The conductive sheet stack 12 has the first transparent substrate 14A, the first conductive part 13A (including the first conductive patterns 26A) formed in the first exposure pattern on the one main surface of the first transparent substrate 14A, and the second conductive part 13B (including the second conductive patterns 26B) formed in the second exposure pattern on the other main surface of the first transparent substrate 14A. Preferred exposure time and development time for the first photosensitive layer 142*a* and the second photosensitive layer 142*b* depend on the types of the first light source 148*a*, the second light source 148*b*, and a developer, etc., and cannot be categorically determined. The exposure time and development time may be selected in view of achieving a development ratio of 100%.

Figure 18:
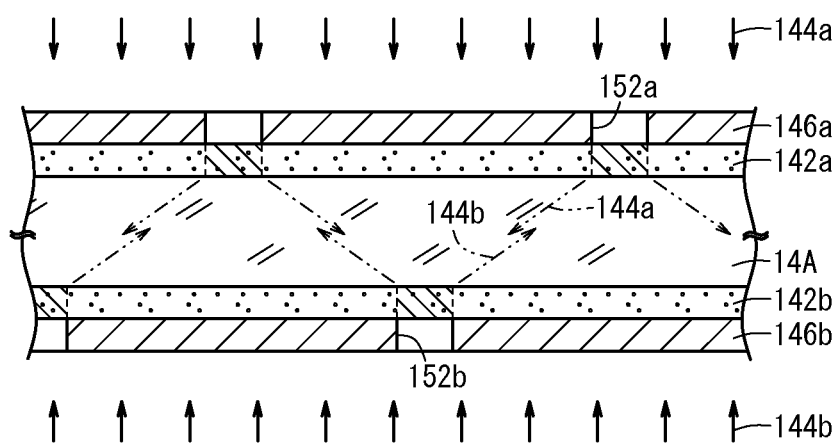
FIG. 18 is an explanatory view for illustrating first and second exposure treatments performed such that a light incident on a first photosensitive layer does not reach a second photosensitive layer and a light incident on the second photosensitive layer does not reach the first photosensitive layer.

As shown in FIG. 18, in the first exposure treatment in the production method of this embodiment, for example, the first photomask 146*a* is placed on the first photosensitive layer 142*a* in close contact therewith, the first light source 148*a* is arranged facing the first photomask 146*a*, and the first light 144*a* is emitted from the first light source 148*a* toward the first photomask 146*a*, so that the first photosensitive layer 142*a* is exposed. The first photomask 146*a* has a glass substrate composed of a transparent soda glass and a mask pattern (a first exposure pattern 152*a*) formed thereon. Therefore, in the first exposure treatment, areas in the first photosensitive layer 142*a*, corresponding to the first exposure pattern 152*a* in the first photomask 146*a*, are exposed. A space of approximately 2 to 10 μm may be formed between the first photosensitive layer 142*a* and the first photomask 146*a*.

Similarly, in the second exposure treatment, for example, the second photomask 146*b* is placed on the second photosensitive layer 142*b* in close contact therewith, the second light source 148*b* is arranged facing the second photomask 146*b*, and the second light 144*b* is emitted from the second light source 148*b* toward the second photomask 146*b*, so that the second photosensitive layer 142*b* is exposed. The second photomask 146*b*, as well as the first photomask 146*a*, has a glass substrate composed of a transparent soda glass and a mask pattern (a second exposure pattern 152*b*) formed thereon. Therefore, in the second exposure treatment, areas in the second photosensitive layer 142*b*, corresponding to the second exposure pattern 152*b* in the second photomask 146*b*, are exposed. In this case, a space of approximately 2 to 10 μm may be formed between the second photosensitive layer 142*b* and the second photomask 146*b*.

In the first and second exposure treatments, the emission of the first light 144*a* from the first light source 148*a* and the emission of the second light 144*b* from the second light source 148*b* may be carried out simultaneously or independently. If the emissions are simultaneously carried out, the first photosensitive layer 142*a* and the second photosensitive layer 142*b* can be simultaneously exposed in one exposure process to reduce the treatment time.

In a case where both of the first photosensitive layer 142*a* and the second photosensitive layer 142*b* are not spectrally sensitized, a light incident on one side may affect the image formation on the other side (the back side) in the both-side exposure of the photosensitive material 140.

Thus, the first light 144*a* from the first light source 148*a* reaches the first photosensitive layer 142*a* and is scattered by silver halide particles in the first photosensitive layer 142*a*, and a part of the scattered light is transmitted through the first transparent substrate 14A and reaches the second photosensitive layer 142*b*. Then, a large area of the boundary between the second photosensitive layer 142*b* and the first transparent substrate 14A is exposed to form a latent image. As a result, the second photosensitive layer 142*b* is exposed to the second light 144*b* from the second light source 148*b* and the first light 144*a* from the first light source 148*a*. When the second photosensitive layer 142*b* is developed to prepare the first conductive sheet stack 12A, the conductive pattern corresponding to the second exposure pattern 152*b* (the second conductive part 13B) is formed, and additionally a thin conductive layer is formed due to the first light 144*a* from the first light source 148*a* between the conductive patterns, so that the desired pattern (corresponding to the second exposure pattern 152*b*) cannot be obtained. This is true also for the first photosensitive layer 142*a*.

As a result of intense research in view of solving this problem, it has been found that when the thicknesses and the applied silver amounts of the first photosensitive layer 142*a* and the second photosensitive layer 142*b* are selected within particular ranges, the incident light can be absorbed by the silver halide to suppress the light transmission to the back side. In this embodiment, the thicknesses of the first photosensitive layer 142*a* and the second photosensitive layer 142*b* may be 1 to 4 μm. The upper limit is preferably 2.5 μm. The applied silver amounts of the first photosensitive layer 142*a* and the second photosensitive layer 142*b* may be 5 to 20 g/m$^2$.

In the above described exposure technology in close-contact with both sides, the exposure may be inhibited by dust or the like attached to the film surface, causing an image defect.

It is known that the dust attachment can be prevented by applying a conductive substance such as a metal oxide or a conductive polymer to the film. However, the metal oxide or the like remains in the processed product to deteriorate the transparency of the final product, and the conductive polymer is disadvantageous in storage stability, etc. As a result of intense research, it has been found that a silver halide layer with reduced binder content exhibits a satisfactory conductivity for static charge prevention. Thus, the volume ratio of silver/binder is controlled in the first photosensitive layer 142a and the second photosensitive layer 142b. The silver/binder volume ratios of the first photosensitive layer 142a and the second photosensitive layer 142b are 1/1 or more, preferably 2/1 or more.

In a case where the thicknesses, the applied silver amounts, and the silver/binder volume ratios of the first photosensitive layer 142a and the second photosensitive layer 142b are selected as described above, the first light 144a emitted from the first light source 148a to the first photosensitive layer 142a does not reach the second photosensitive layer 142b as shown in FIG. 18. Similarly, the second light 144b emitted from the second light source 148b to the second photosensitive layer 142b does not reach the first photosensitive layer 142a. As a result, in the following development for producing first conductive sheet stack 12A, as shown in FIG. 3B, only the conductive pattern corresponding to the first exposure pattern 152a (the pattern of the first conductive part 13A) is formed on the one main surface of the first transparent substrate 14A, and only the conductive pattern corresponding to the second exposure pattern 152b (the pattern of the second conductive part 13B) is formed on the other main surface of the first transparent substrate 14A, so that the desired patterns can be obtained.

In the production method using the above one-shot exposure on both sides, the first photosensitive layer 142a and the second photosensitive layer 142b can have both of the satisfactory conductivity and both-side exposure suitability, and the same or different patterns can be formed on the surfaces of the one first transparent substrate 14A by the exposure, whereby the electrodes of the touch panel 100 can be easily formed, and the touch panel 100 can be made thinner (smaller).

In the above production method, the first conductive part 13A and the second conductive part 13B are formed using the photosensitive silver halide emulsion layers. The other production methods include the following methods.

A photosensitive plating base layer containing a pre-plating treatment material may be formed on the first transparent substrate 14A or the second transparent substrate 14B. The resultant layer may be exposed and developed, and may be subjected to a plating treatment, whereby metal portions and light-transmitting portions may be formed in the exposed areas and the unexposed areas respectively to form the first conductive patterns 26A or the second conductive patterns 26B. The metal portions may be further subjected to a physical development treatment and/or a plating treatment to deposit a conductive metal thereon.

The following two processes can be preferably used in the method using the pre-plating treatment material. The processes are disclosed more specifically in Japanese Laid-Open Patent Publication Nos. 2003-213437, 2006-64923, 2006-58797, and 2006-135271, etc.

(a) A process comprising applying, to a transparent substrate, a plating base layer having a functional group interactable with a plating catalyst or a precursor thereof, exposing and developing the layer, and subjecting the developed layer to a plating treatment to form a metal portion on the plating base material.

(b) A process comprising applying, to a transparent substrate, an underlayer containing a polymer and a metal oxide and a plating base layer having a functional group interactable with a plating catalyst or a precursor thereof in this order, exposing and developing the layers, and subjecting the developed layers to a plating treatment to form a metal portion on the plating base material.

Alternatively, a photoresist film on a copper foil disposed on the first transparent substrate 14A or the second transparent substrate 14B may be exposed and developed to form a resist pattern, and the copper foil exposed from the resist pattern may be etched to form the first conductive part 13A or the second conductive part 13B.

A paste containing fine metal particles may be printed on the first transparent substrate 14A or the second transparent substrate 14B, and the printed paste may be plated with a metal to form the first conductive part 13A or the second conductive part 13B.

The first conductive part 13A or the second conductive part 13B may be printed on the first transparent substrate 14A or the second transparent substrate 14B by using a screen or gravure printing plate.

The first conductive part 13A or the second conductive part 13B may be formed on the first transparent substrate 14A or the second transparent substrate 14B by using an inkjet method.

A particularly preferred method, which contains using a photographic photosensitive silver halide material for producing the first conductive sheet 10A or the second conductive sheet 10B of this embodiment, will be mainly described below.

The method for producing the first conductive sheet 10A or the second conductive sheet 10B of this embodiment includes the following three processes different in the photosensitive materials and development treatments.

(1) A process comprising subjecting a photosensitive black-and-white silver halide material free of physical development nuclei to a chemical or thermal development to form the metallic silver portions on the photosensitive material.

(2) A process comprising subjecting a photosensitive black-and-white silver halide material having a silver halide emulsion layer containing physical development nuclei to a solution physical development to form the metallic silver portions on the photosensitive material.

(3) A process comprising subjecting a stack of a photosensitive black-and-white silver halide material free of physical development nuclei and an image-receiving sheet having a non-photosensitive layer containing physical development nuclei to a diffusion transfer development to form the metallic silver portions on the non-photosensitive image-receiving sheet.

In the process of (1), an integral black-and-white development procedure is used to form a transmittable conductive film such as a light-transmitting conductive film on the photosensitive material. The resulting silver is a chemically or thermally developed silver in the state of a high-specific surface area filament, and thereby shows a high activity in the following plating or physical development treatment.

In the process of (2), the silver halide particles are melted around and deposited on the physical development nuclei in the exposed areas to form a transmittable conductive film such as a light-transmitting conductive film on the photosensitive material. Also in this process, an integral black-and-white development procedure is used. Though high activity can be achieved since the silver halide is deposited on the physical development nuclei in the development, the developed silver has a spherical shape with small specific surface.

In the process of (3), the silver halide particles are melted in the unexposed areas, and are diffused and deposited on the development nuclei of the image-receiving sheet, to form a transmittable conductive film such as a light-transmitting conductive film on the sheet. In this process, a so-called separate-type procedure is used, the image-receiving sheet being peeled off from the photosensitive material.

A negative or reversal development treatment can be used in the processes. In the diffusion transfer development, the negative development treatment can be carried out using an auto-positive photosensitive material.

The chemical development, thermal development, solution physical development, and diffusion transfer development have the meanings generally known in the art, and are explained in common photographic chemistry texts such as Shin-ichi Kikuchi, "*Shashin Kagaku (Photographic Chemistry)*", Kyoritsu Shuppan Co., Ltd., 1955 and C. E. K. Mees, "*The Theory of Photographic Processes,* 4th ed.", Mcmillan, 1977. A liquid treatment is generally used in the present invention, and also a thermal development treatment can be utilized. For example, techniques described in Japanese Laid-Open Patent Publication Nos. 2004-184693, 2004-334077, and 2005-010752 and Japanese Patent Application Nos. 2004-244080 and 2004-085655 can be used in the present invention.

The structure of each layer in the first conductive sheet 10A and the second conductive sheet 10B of this embodiment will be described in detail below.

[First Transparent Substrate 14A and Second Transparent Substrate 14B]

The first transparent substrate 14A and the second transparent substrate 14B may be a plastic film, a plastic plate, a glass plate, etc.

Examples of materials for the plastic film and the plastic plate include polyesters such as polyethylene terephthalates (PET) and polyethylene naphthalates (PEN); polyolefins such as polyethylenes (PE), polypropylenes (PP), polystyrenes, and EVA; vinyl resins; polycarbonates (PC); polyamides; polyimides; acrylic resins; and triacetyl celluloses (TAC).

The first transparent substrate 14A and the second transparent substrate 14B are preferably a film or plate of a plastic having a melting point of about 290° C. or lower, such as PET (melting point 258° C.), PEN (melting point 269° C.), PE (melting point 135° C.), PP (melting point 163° C.), polystyrene (melting point 230° C.), polyvinyl chloride (melting point 180° C.), polyvinylidene chloride (melting point 212° C.), or TAC (melting point 290° C.). The PET is particularly preferred from the viewpoints of light transmittance, workability, etc. The conductive film such as the first conductive sheet 10A or the second conductive sheet 10B used in the conductive sheet stack 12 is required to be transparent, and therefore the first transparent substrate 14A and the second transparent substrate 14B preferably have a high transparency.

[Silver Salt Emulsion Layer]

The silver salt emulsion layer for forming the conductive layers of the first conductive sheet 10A and the second conductive sheet 10B (including the first large lattices 16A, the first connections 22A, the first insulation patterns 34A of the first insulations 28A, the second large lattices 16B, the second connections 22B, the second insulation patterns 34B of the second insulations 28B, and the small lattices 18) contains a silver salt and a binder and may further contain a solvent and an additive such as a dye.

The silver salt used in this embodiment may be an inorganic silver salt such as a silver halide or an organic silver salt such as silver acetate. In this embodiment, the silver halide is preferred because of its excellent light sensing property.

The applied silver amount (the amount of the applied silver salt in the silver density) of the silver salt emulsion layer is preferably 1 to 30 $g/m^2$, more preferably 1 to 25 $g/m^2$, further preferably 5 to 20 $g/m^2$. When the applied silver amount is within this range, the resultant conductive sheet stack 12 can exhibit a desired surface resistance.

Examples of the binders used in this embodiment include gelatins, polyvinyl alcohols (PVA), polyvinyl pyrolidones (PVP), polysaccharides such as starches, celluloses and derivatives thereof, polyethylene oxides, polyvinylamines, chitosans, polylysines, polyacrylic acids, polyalginic acids, polyhyaluronic acids, and carboxycelluloses. The binders show a neutral, anionic, or cationic property depending on the ionicity of a functional group.

In this embodiment, the amount of the binder in the silver salt emulsion layer is not particularly limited, and may be appropriately selected to obtain sufficient dispersion and adhesion properties. The volume ratio of silver/binder in the silver salt emulsion layer is preferably ¼ or more, more preferably ½ or more. The silver/binder volume ratio is preferably 100/1 or less, more preferably 50/1 or less. Particularly, the silver/binder volume ratio is further preferably 1/1 to 4/1, most preferably 1/1 to 3/1. As long as the silver/binder volume ratio of the silver salt emulsion layer falls within this range, the resistance variation can be reduced even under various applied silver amount, whereby the conductive sheet stack can be produced with a uniform surface resistance. The silver/binder volume ratio can be obtained by converting the silver halide/binder weight ratio of the material to the silver/binder weight ratio, and by further converting the silver/binder weight ratio to the silver/binder volume ratio.

<Solvent>

The solvent used for forming the silver salt emulsion layer is not particularly limited, and examples thereof include water, organic solvents (e.g. alcohols such as methanol, ketones such as acetone, amides such as formamide, sulfoxides such as dimethyl sulfoxide, esters such as ethyl acetate, ethers), ionic liquids, and mixtures thereof.

In this embodiment, the ratio of the solvent to the total of the silver salt, the binder, and the like in the silver salt emulsion layer is 30% to 90% by mass, preferably 50% to 80% by mass.

<Other Additives>

The additives used in this embodiment are not particularly limited, and may be preferably selected from known additives.

[Other Layers]

A protective layer (not shown) may be formed on the silver salt emulsion layer. The protective layer used in this embodiment contains a binder such as a gelatin or a high-molecular polymer, and is disposed on the photosensitive silver salt emulsion layer to improve the scratch prevention or mechanical property. The thickness of the protective layer is preferably 0.5 μm or less. The method of applying or forming the protective layer is not particularly limited, and may be appropriately selected from known applying or forming methods. In addition, an undercoat layer or the like may be formed below the silver salt emulsion layer.

The steps for producing the first conductive sheet 10A and the second conductive sheet 10B will be described below.

[Exposure]

In this embodiment, the first conductive part 13A and the second conductive part 13B may be formed in a printing process, and may be formed by exposure and development treatments, etc. in another process. Thus, a photosensitive material having the first transparent substrate 14A or the second transparent substrate 14B and thereon the silver salt-containing layer or a photosensitive material coated with a photopolymer for photolithography is subjected to the exposure treatment. An electromagnetic wave may be used in the exposure. For example, the electromagnetic wave may be a light such as a visible light or an ultraviolet light, or a radiation ray such as an X-ray. The exposure may be carried out using a light source having a wavelength distribution or a specific wavelength.

[Development Treatment]

In this embodiment, the emulsion layer is subjected to the development treatment after the exposure. Common development treatment technologies for photographic silver salt films, photographic papers, print engraving films, emulsion masks for photomasking, and the like may be used in the present invention. The developer used in the development treatment is not particularly limited, and may be a PQ developer, an MQ developer, an MAA developer, etc. Examples of commercially available developers usable in the present invention include CN-16, CR-56, CP45X, FD-3, and PAPITOL available from FUJIFILM Corporation, C-41, E-6, RA-4, D-19, and D-72 available from Eastman Kodak Company, and developers contained in kits thereof. The developer may be a lith developer.

In the present invention, the development process may include a fixation treatment for removing the silver salt in the unexposed areas to stabilize the material. Fixation treatment technologies for photographic silver salt films, photographic papers, print engraving films, emulsion masks for photomasking, and the like may be used in the present invention.

In the fixation treatment, the fixation temperature is preferably about 20° C. to 50° C., more preferably 25° C. to 45° C. The fixation time is preferably 5 seconds to 1 minute, more preferably 7 to 50 seconds. The amount of the fixer used is preferably 600 ml/m$^2$ or less, more preferably 500 ml/m$^2$ or less, particularly preferably 300 ml/m$^2$ or less, per 1 m$^2$ of the photosensitive material treated.

The developed and fixed photosensitive material is preferably subjected to a water washing treatment or a stabilization treatment. The amount of water used in the water washing or stabilization treatment is generally 20 L or less, and may be 3 L or less, per 1 m$^2$ of the photosensitive material. The water amount may be 0, and thus the photosensitive material may be washed with storage water.

The ratio of the metallic silver contained in the exposed areas after the development to the silver contained in the areas before the exposure is preferably 50% or more, more preferably 80% or more by mass. When the ratio is 50% or more by mass, a high conductivity can be achieved.

In this embodiment, the tone (gradation) obtained by the development is preferably more than 4.0, though not particularly restrictive. When the tone is more than 4.0 after the development, the conductivity of the conductive metal portion can be increased while maintaining the high transmittance of the light-transmitting portion. For example, the tone of 4.0 or more can be obtained by doping with rhodium or iridium ion.

The conductive sheet is obtained by the above steps. The surface resistance of the resultant conductive sheet is preferably within a range of 0.1 to 100 ohm/sq. The lower limit is preferably 1 ohm/sq or more, 3 ohm/sq or more, 5 ohm/sq or more, or 10 ohm/sq or more. The upper limit is preferably 70 ohm/sq or less or 50 ohm/sq or less. When the surface resistance is controlled within this range, the position detection can be performed even in a large touch panel having an area of 10 cm×10 cm or more. The conductive sheet may be subjected to a calender treatment after the development treatment to obtain a desired surface resistance.

[Physical Development Treatment and Plating Treatment]

In this embodiment, to increase the conductivity of the metallic silver portion formed by the above exposure and development treatments, conductive metal particles may be deposited thereon by a physical development treatment and/or a plating treatment. In the present invention, the conductive metal particles may be deposited on the metallic silver portion by only one of the physical development and plating treatments or by the combination of the treatments. The metallic silver portion, subjected to the physical development treatment and/or the plating treatment in this manner, is also referred to as the conductive metal portion.

In this embodiment, the physical development is such a process that metal ions such as silver ions are reduced by a reducing agent, whereby metal particles are deposited on a metal or metal compound core. Such physical development has been used in the fields of instant B & W film, instant slide film, printing plate production, etc., and the technologies can be used in the present invention.

The physical development may be carried out at the same time as the above development treatment after the exposure, and may be carried out after the development treatment separately.

In this embodiment, the plating treatment may contain electroless plating (such as chemical reduction plating or displacement plating), electrolytic plating, or a combination thereof. Known electroless plating technologies for printed circuit boards, etc. may be used in this embodiment. The electroless plating is preferably electroless copper plating.

[Oxidation Treatment]

In this embodiment, the metallic silver portion formed by the development treatment or the conductive metal portion formed by the physical development treatment and/or the plating treatment is preferably subjected to an oxidation treatment. For example, by the oxidation treatment, a small amount of a metal deposited on the light-transmitting portion can be removed, so that the transmittance of the light-transmitting portion can be increased to approximately 100%.

[Conductive Metal Portion]

In this embodiment, the lower limit of the line width of the conductive metal portion is preferably 1 μm or more, 3 μm or more, 4 μm or more, or 5 μm or more, and the upper limit thereof is preferably 15 μm or less, 10 μm or less, 9 μm or less, or 8 μm or less. When the line width is less than the lower limit, the conductive metal portion has an insufficient conductivity, whereby a touch panel using the conductive part has an insufficient detection sensitivity. On the other hand, when the line width is more than the upper limit, moire is significantly generated due to the conductive metal portion, and a touch panel using the conductive part has a poor visibility. When the line width is within the above range, the moire of the conductive metal portion is improved, and the visibility is remarkably improved. The side length of the small lattice is preferably 30 to 500 μm, more preferably 50 to 400 μm, most preferably 100 to 350 μm. The conductive metal portion may have a part with a line width of more than 200 μm for the purpose of ground connection, etc.

In this embodiment, the opening ratio of the conductive metal portion is preferably 85% or more, more preferably 90% or more, most preferably 95% or more, in view of the visible light transmittance. The opening ratio is the ratio of the light-transmitting portions other than the conductive portions including the first large lattices 16A, the first connections 22A, the first insulation patterns 34A of the first insulations 28A, the second large lattices 16B, the second connections 22B, the second insulation patterns 34B of the second insulations 28B, and the small lattices 18 to the entire conductive part. For example, a square lattice having a line width of 15 μm and a pitch of 300 μm has an opening ratio of 90%.

[Light-Transmitting Portion]

In this embodiment, the light-transmitting portion is a portion having light transmittance, other than the conductive metal portions in the first conductive sheet 10A and the second conductive sheet 10B. The transmittance of the light-transmitting portion, which is herein a minimum transmittance value in a wavelength region of 380 to 780 nm obtained neglecting the light absorption and reflection of the first transparent substrate 14A and the second transparent substrate 14B, is 90% or more, preferably 95% or more, more preferably 97% or more, further preferably 98% or more, most preferably 99% or more.

The exposure is preferably carried out using a glass mask method or a laser lithography pattern exposure method.

[First Conductive Sheet 10A and Second Conductive Sheet 10B]

In the first conductive sheet 10A and the second conductive sheet 10B of this embodiment, the thicknesses of the first transparent substrate 14A and the second transparent substrate 14B are preferably 75 to 350 μm. When the thicknesses are within the range of 75 to 350 μm, a desired visible light transmittance can be obtained, the substrates can be easily handled, and the parasitic capacitance between the first conductive patterns 26A and the second conductive patterns 26B can be lowered.

The thickness of the metallic silver portion formed on the first transparent substrate 14A or the second transparent substrate 14B may be appropriately selected by controlling the thickness of the coating liquid for the silver salt-containing layer applied to the first transparent substrate 14A or the second transparent substrate 14B. The thickness of the metallic silver portion may be selected within a range of 0.001 to 0.2 mm, and is preferably 30 μm or less, more preferably 20 μm or less, further preferably 0.01 to 9 μm, most preferably 0.05 to 5 μm. The metallic silver portion is preferably formed in a patterned shape. The metallic silver portion may have a monolayer structure or a multilayer structure containing two or more layers. When the metallic silver portion has a patterned multilayer structure containing two or more layers, the layers may have different wavelength color sensitivities. In this case, different patterns can be formed in the layers by using exposure lights with different wavelengths.

In the case of using the first conductive sheet 10A or the second conductive sheet 10B in a touch panel, the conductive metal portion preferably has a smaller thickness. As the thickness is reduced, the viewing angle and visibility of the display panel are improved. Thus, the thickness of the layer of the conductive metal on the conductive metal portion is preferably less than 9 μm, more preferably 0.1 μm or more but less than 5 μm, further preferably 0.1 μm or more but less than 3 μm.

In this embodiment, the thickness of the metallic silver portion can be controlled by changing the coating thickness of the silver salt-containing layer, and the thickness of the conductive metal particle layer can be controlled in the physical development treatment and/or the plating treatment, whereby the first conductive sheet 10A and the second conductive sheet 10B having a thickness of less than 5 μm (preferably less than 3 μm) can be easily produced.

The plating or the like is not necessarily carried out in the method for producing the first conductive sheet 10A and the second conductive sheet 10B of this embodiment. This is because the desired surface resistance can be obtained by controlling the applied silver amount and the silver/binder volume ratio of the silver salt emulsion layer in the method. The calender treatment or the like may be carried out if necessary.

(Film Hardening Treatment after Development Treatment)

It is preferred that after the silver salt emulsion layer is developed, the resultant is immersed in a hardener and thus subjected to a film hardening treatment. Examples of the hardeners include dialdehydes (such as glutaraldehyde, adipaldehyde, and 2,3-dihydroxy-1,4-dioxane) and boric acid, described in Japanese Laid-Open Patent Publication No. 02-141279.

[Conductive Sheet Stack]

An additional functional layer such as an antireflection layer or a hard coat layer may be formed in the conductive sheet stack.

The present invention may be appropriately combined with technologies described in the following patent publications and international patent pamphlets shown in Tables 1 and 2. "Japanese Laid-Open Patent", "Publication No.", "Pamphlet No.", etc. are omitted therein.

TABLE 1

| | | | | |
|---|---|---|---|---|
| 2004-221564 | 2004-221565 | 2007-200922 | 2006-352073 | 2007-129205 |
| 2007-235115 | 2007-207987 | 2006-012935 | 2006-010795 | 2006-228469 |
| 2006-332459 | 2009-21153 | 2007-226215 | 2006-261315 | 2007-072171 |
| 2007-102200 | 2006-228473 | 2006-269795 | 2006-269795 | 2006-324203 |
| 2006-228478 | 2006-228836 | 2007-009326 | 2006-336090 | 2006-336099 |
| 2006-348351 | 2007-270321 | 2007-270322 | 2007-201378 | 2007-335729 |
| 2007-134439 | 2007-149760 | 2007-208133 | 2007-178915 | 2007-334325 |
| 2007-310091 | 2007-116137 | 2007-088219 | 2007-207883 | 2007-013130 |
| 2005-302508 | 2008-218784 | 2008-227350 | 2008-227351 | 2008-244067 |
| 2008-267814 | 2008-270405 | 2008-277675 | 2008-277676 | 2008-282840 |
| 2008-283029 | 2008-288305 | 2008-288419 | 2008-300720 | 2008-300721 |
| 2009-4213 | 2009-10001 | 2009-16526 | 2009-21334 | 2009-26933 |
| 2008-147507 | 2008-159770 | 2008-159771 | 2008-171568 | 2008-198388 |
| 2008-218096 | 2008-218264 | 2008-224916 | 2008-235224 | 2008-235467 |
| 2008-241987 | 2008-251274 | 2008-251275 | 2008-252046 | 2008-277428 |

TABLE 2

| | | | | |
|---|---|---|---|---|
| 2006/001461 | 2006/088059 | 2006/098333 | 2006/098336 | 2006/098338 |
| 2006/098335 | 2006/098334 | 2007/001008 | | |

EXAMPLES

The present invention will be described more specifically below with reference to Examples. Materials, amounts, ratios, treatment contents, treatment procedures, and the like, used in Examples, may be appropriately changed without departing from the scope of the present invention.

The following specific examples are therefore to be considered in all respects as illustrative and not restrictive.

First Example

In First Example, in Examples 1 to 9 and Comparative Examples 1 and 2, the ratio (A2/A1) of the occupation area A2 of the thin metal wires 15 in the second conductive patterns 26B to the occupation area A1 of the thin metal wires 15 in the first conductive patterns 26A and the ratio (a2/a1) of the occupation area a2 of the thin metal wires 15 in the second large lattices 16B to the occupation area a1 of the thin metal wires 15 in the first large lattices 16A were changed to evaluate the surface resistances of the first conductive patterns 26A and the second conductive patterns 26B and the detection sensitivity of the conductive sheet stack 12. The properties and evaluation results of Examples 1 to 9 and Comparative Examples 1 and 2 are shown in Table 3.

Examples 1 to 9 and Comparative Examples 1 and 2

Photosensitive Silver Halide Material

An emulsion containing an aqueous medium, a gelatin, and silver iodobromochloride particles was prepared. The amount of the gelatin was 10.0 g per 150 g of Ag, and the silver iodobromochloride particles had an I content of 0.2 mol %, a Br content of 40 mol %, and an average spherical equivalent diameter of 0.1 μm.

$K_3Rh_2Br_9$ and $K_2IrCl_6$ were added to the emulsion at a concentration of $10^{-7}$ (mol/mol-silver) to dope the silver bromide particles with Rh and Ir ions. $Na_2PdCl_4$ was further added to the emulsion, and the resultant emulsion was subjected to gold-sulfur sensitization using chlorauric acid and sodium thiosulfate. The emulsion and a gelatin hardening agent were applied to the first transparent substrate 14A or the second transparent substrate 14B having a thickness of 150 μm, both composed of a polyethylene terephthalate (PET). The amount of the applied silver was 10 g/m$^2$, and the Ag/gelatin volume ratio was 2/1.

The PET support had a width of 30 cm, and the emulsion was applied thereto into a width of 25 cm and a length of 20 m. The both end portions having a width of 3 cm were cut off to obtain a roll photosensitive silver halide material having a width of 24 cm.

(Exposure)

An A4 (210 mm×297 mm) sized area of the first transparent substrate 14A was exposed in the pattern of the first conductive sheet 10A shown in FIG. 11, and an A4 sized area of the second transparent substrate 14B was exposed in the pattern of the second conductive sheet 10B shown in FIG. 12. The exposure was carried out using a parallel light from a light source of a high-pressure mercury lamp and patterned photomasks. The pattern width was controlled, so that the first small lattices 18a had a side length of 80 μm (the second small lattices 18b had a side length of 160 μm), and the thin metal wires 15 had a width of 5 μm.

(Development Treatment)

Formulation of 1 L of Developer

| | |
|---|---|
| Hydroquinone | 20 g |
| Sodium sulfite | 50 g |
| Potassium carbonate | 40 g |
| Ethylenediaminetetraacetic acid | 2 g |
| Potassium bromide | 3 g |
| Polyethylene glycol 2000 | 1 g |
| Potassium hydroxide | 4 g |
| pH | Controlled at 10.3 |

Formulation of 1 L of Fixer

| | |
|---|---|
| Ammonium thiosulfate solution (75%) | 300 ml |
| Ammonium sulfite monohydrate | 25 g |
| 1,3-Diaminopropanetetraacetic acid | 8 g |
| Acetic acid | 5 g |
| Aqueous ammonia (27%) | 1 g |
| pH | Controlled at 6.2 |

The exposed photosensitive material was treated with the above treatment agents using an automatic processor FG-710PTS manufactured by FUJIFILM Corporation under the following conditions. A development treatment was carried out at 35° C. for 30 seconds, a fixation treatment was carried out at 34° C. for 23 seconds, and then a water washing treatment was carried out for 20 seconds at a water flow rate of 5 L/min.

Example 1

The first conductive sheet 10A and the second conductive sheet 10B of Example 1 were produced in the above manner. Both of the occupation area ratios A2/A1 and a2/a1 were 2.

Example 2

The first conductive sheet 10A and the second conductive sheet 10B of Example 2 were produced in the same manner as Example 1 except that both of the occupation area ratios A2/A1 and a2/a1 were 3.

Example 3

The first conductive sheet 10A and the second conductive sheet 10B of Example 3 were produced in the same manner as Example 1 except that both of the occupation area ratios A2/A1 and a2/a1 were 3.3.

Example 4

The first conductive sheet 10A and the second conductive sheet 10B of Example 4 were produced in the same manner as Example 1 except that both of the occupation area ratios A2/A1 and a2/a1 were 5.

Example 5

The first conductive sheet 10A and the second conductive sheet 10B of Example 5 were produced in the same manner as Example 1 except that both of the occupation area ratios A2/A1 and a2/a1 were 7.

Example 6

The first conductive sheet 10A and the second conductive sheet 10B of Example 6 were produced in the same manner as Example 1 except that both of the occupation area ratios A2/A1 and a2/a1 were 8.

Example 7

The first conductive sheet 10A and the second conductive sheet 10B of Example 7 were produced in the same manner as Example 1 except that both of the occupation area ratios A2/A1 and a2/a1 were 10.

Example 8

The first conductive sheet 10A and the second conductive sheet 10B of Example 8 were produced in the same manner as Example 1 except that both of the occupation area ratios A2/A1 and a2/a1 were 15.

Example 9

The first conductive sheet 10A and the second conductive sheet 10B of Example 9 were produced in the same manner as Example 1 except that both of the occupation area ratios A2/A1 and a2/a1 were 20.

Comparative Example 1

The first conductive sheet 10A and the second conductive sheet 10B of Comparative Example 1 were produced in the same manner as Example 1 except that both of the occupation area ratios A2/A1 and a2/a1 were 1.

Comparative Example 2

The first conductive sheet 10A and the second conductive sheet 10B of Comparative Example 2 were produced in the same manner as Example 1 except that both of the occupation area ratios A2/A1 and a2/a1 were 25.

(Surface Resistance Measurement)

In each of the first conductive sheets 10A and the second conductive sheets 10B, the surface resistivity values of optionally selected 10 points were measured by LORESTA GP (Model No. MCP-T610) manufactured by Dia Instruments Co., Ltd. utilizing an in-line four-probe method (ASP), and the average of the measured values was obtained to evaluate the detection accuracy.

(Detection Sensitivity Evaluation)

A finger was moved in a predetermined direction on each touch panel to obtain a detection waveform. The detection sensitivity was evaluated based on the detection waveform. The touch panel was evaluated as "Excellent" when the detection sensitivity was more than 110% of a predetermined threshold value, as "Good" when it was 90% to 110% of the threshold value, or as "Fair" when it was less than 90% of the threshold value.

The results of Examples 1 to 9 and Comparative Examples 1 and 2 are shown in Table 3.

TABLE 3

| | Occupation area ratio (A2/A1) | Occupation area ratio (a2/a1) | Surface resistance of first conductive pattern (ohm/sq) | Surface resistance of second conductive pattern (ohm/sq) | Detection sensitivity |
|---|---|---|---|---|---|
| Comparative Example 1 | 1 | 1 | 75 | 75 | Fair |
| Example 1 | 2 | 2 | 75 | 70 | Good |
| Example 2 | 3 | 3 | 76 | 70 | Good |
| Example 3 | 3.3 | 3.3 | 77 | 65 | Excellent |
| Example 4 | 5 | 5 | 78 | 60 | Excellent |
| Example 5 | 7 | 7 | 80 | 50 | Excellent |
| Example 6 | 8 | 8 | 82 | 40 | Excellent |
| Example 7 | 10 | 10 | 85 | 35 | Good |
| Example 8 | 15 | 15 | 90 | 30 | Good |
| Example 9 | 20 | 20 | 100 | 20 | Good |
| Comparative Example 2 | 25 | 25 | 150 | 10 | Fair |

As shown in Table 3, the conductive sheet stacks 12 of Comparative Examples 1 and 2 had low detection sensitivities. In Comparative Example 1, the second conductive patterns 26B had a high surface resistance of 75 ohm/sq, and it was likely that the second conductive patterns 26B could not reduce the noise impact of the electromagnetic wave. In Comparative Example 2, though the second conductive patterns 26B had a significantly low surface resistance, the first conductive patterns 26A had a high surface resistance of 150 ohm/sq. It was likely that the detection sensitivity of the first large lattices 16A was deteriorated due to the high surface resistance.

In contrast, the conductive sheet stacks 12 of Examples 1 to 9 had high detection sensitivities. Particularly the conductive sheet stacks 12 of Examples 3 to 6 had excellent detection sensitivities.

Therefore, it is clear that the ratio of the occupation area A2 of the thin metal wires 15 in the second conductive patterns 26B to the occupation area A1 of the thin metal wires 15 in the first conductive patterns 26A preferably satisfies 1<A2/A1≤20, further preferably satisfies 1<A2/A1≤10, and particularly preferably satisfies 2≤A2/A1≤10. Furthermore, it is clear that the ratio of the occupation area a2 of the thin metal wires 15 in the second large lattices 16B to the occupation area a1 of the thin metal wires 15 in the first large lattices 16A preferably satisfies 1<a2/a1≤20, further preferably satisfies 1<a2/a1≤10, and particularly preferably satisfies 2≤a2/a1≤10.

Second Example

In Second Example, conductive sheet stacks 12 of Examples 11 to 17 and Reference Examples 1 and 2 were produced in the same manner as Example 1. In Examples 11 to 17 and Reference Examples 1 and 2, the thickness of the first transparent substrate 14A was changed to evaluate the detection sensitivity and the visibility. The properties and evaluation results of Examples 11 to 17 and Reference Example 1 and 2 are shown in Table 4.

(Transmittance Measurement)

The transmittance value of the light-transmitting portion in the first conductive sheet 10A and the second conductive sheet 10B was measured by a spectrophotometer to evaluate the transparency of the first transparent substrate 14A.

(Visibility Evaluation)

The first conductive sheet 10A was stacked on the second conductive sheet 10B to produce the conductive sheet stack 12. The conductive sheet stack 12 was attached to the display screen of the display device 108 (liquid crystal display) to form the touch panel 100. The touch panel 100 was fixed to a turntable, and the display device 108 was operated to display a white color. Whether a thickened line or a black point was formed or not on the touch panel 100 and whether boundaries between the first conductive patterns 26A and the second conductive patterns 26B and between the first large lattices 16A and the second large lattices 16B in the touch panel 100 were visible or not were observed by the naked eye.

TABLE 4

| | Thickness of transparent substrate (μm) | Transmittance of light-transmitting portion (%) | Detection sensitivity | Visibility evaluation |
|---|---|---|---|---|
| Reference Example 1 | 70 | 99 | Fair | Good |
| Example 11 | 75 | 99 | Good | Good |
| Example 12 | 80 | 99 | Good | Good |
| Example 13 | 100 | 97 | Excellent | Good |
| Example 14 | 150 | 97 | Excellent | Good |
| Example 15 | 200 | 95 | Excellent | Good |
| Example 16 | 250 | 95 | Good | Good |
| Example 17 | 350 | 90 | Good | Good |
| Reference Example 2 | 400 | 80 | Poor | Poor |

As shown in Table 4, in Reference Example 1, though the conductive sheet stack 12 had a good visibility, it had a low detection sensitivity. It was likely that because the first transparent substrate 14A had a small thickness of 70 μm, a large parasitic capacitance was formed between the first conductive patterns 26A and the second conductive patterns 26B, and the detection sensitivity was deteriorated due to the parasitic capacitance. In Reference Example 2, the conductive sheet stack 12 was poor in both of the detection sensitivity and the visibility. It was likely that because the first transparent substrate 14A had a remarkably large thickness of 400 μm, the finger touch position was hardly detected by the second conductive patterns 26B in the self-capacitance technology, and signals from the second large lattices 16B (the drive electrodes) was hardly received by the first large lattices 16A (the receiving electrodes) in the mutual capacitance technology. The visibility was deteriorated because the first transparent substrate 14A had a remarkably large thickness of 400 μm, whereby the light-transmitting portions had a low transmittance of 80%, lowering the transparency.

In contrast, the conductive sheet stacks 12 of Examples 11 to 17 had high detection sensitivities and high visibilities. Particularly the conductive sheet stacks 12 of Examples 13 to 15 had excellent detection sensitivities.

Therefore, it is clear that the thickness of the transparent substrate (the first transparent substrate 14A) disposed between the first conductive part 13A and the second conductive part 13B is preferably 75 to 350 μm, further preferably 80 μm or more and 250 μm or less, particularly preferably 100 μm or more and 200 μm or less.

Third Example

In Third Example, conductive sheet stacks 12 of Examples 21 to 23 and Reference Examples 11 were produced in the same manner as Example 1. In Examples 21 to 23 and Reference Examples 11, the ratio (a3/a2) of the occupation area a3 of the thin metal wires in the third auxiliary patterns 20C to the occupation area a2 of the thin metal wires in the second large lattices 16B was changed to evaluate the surface resistances of the first conductive patterns 26A and the detection sensitivity of the conductive sheet stack 12. The properties and evaluation results of Examples 21 to 23 and Reference Examples 11 are shown in Table 5.

TABLE 5

|  | Occupation area ratio (a3/a2) | Surface resistance of first conductive pattern (ohm/sq) | Detection sensitivity |
| --- | --- | --- | --- |
| Reference Example 11 | 5/8 | 150 | Fair |
| Example 21 | 4/8 | 85 | Good |
| Example 22 | 3/8 | 70 | Good |
| Example 23 | 2/8 | 50 | Excellent |

As shown in Table 5, in Reference Example 11, the conductive sheet stack 12 had a low detection sensitivity. It was likely that the first conductive patterns 26A had a high surface resistance of 150 ohm/sq, lowering the detection sensitivity of the first large lattices 16A.

In contrast, the conductive sheet stacks 12 of Examples 21 to 23 had high detection sensitivities. Particularly the conductive sheet stack 12 of Example 23 had excellent detection sensitivity.

Therefore, it is clear that the occupation area of the thin metal wires in the third auxiliary patterns 20C is preferably ½ or less, more preferably ¼ or less, of the occupation area of the thin metal wires in the second large lattices 16B.

Fourth Example

In Fourth Example, the visibilities of Samples 1 to 49 were evaluated. With respect to the visibility, the visual finding difficulty of the thin metal wires and transmittance were evaluated. The properties and evaluation results of Samples 1 to 49 are shown in Tables 6 and 7.

<Sample 1>

The photosensitive silver halide material was prepared in the same manner as Example 1 in First Example, and the photosensitive silver halide material was exposed and developed, whereby the first conductive sheet 10A and the second conductive sheet 10B of Sample 1 were produced. In Sample 1, the thin metal wires had a line width of 7 μm and a line pitch of 70 μm.

<Samples 2 to 7>

The first conductive sheets 10A and the second conductive sheets 10B of Samples 2, 3, 4, 5, 6, and 7 were produced in the same manner as Sample 1 except that the thin metal wires had line pitches of 100, 200, 300, 400, 500, and 600 μm respectively.

<Sample 8>

The first conductive sheet 10A and the second conductive sheet 10B of Sample 8 were produced in the same manner as Sample 1 except that the thin metal wires had a line width of 6 μm.

<Samples 9 to 14>

The first conductive sheets 10A and the second conductive sheets 10B of Samples 9, 10, 11, 12, 13, and 14 were produced in the same manner as Sample 8 except that the thin metal wires had line pitches of 100, 200, 300, 400, 500, and 600 μm respectively.

<Sample 15>

The first conductive sheet 10A and the second conductive sheet 10B of Sample 15 were produced in the same manner as Sample 1 except that the thin metal wires had a line width of 5 μm.

<Samples 16 to 21>

The first conductive sheets 10A and the second conductive sheets 10B of Samples 16, 17, 18, 19, 20, and 21 were produced in the same manner as Sample 15 except that the thin metal wires had line pitches of 100, 200, 300, 400, 500, and 600 μm respectively.

<Sample 22>

The first conductive sheet 10A and the second conductive sheet 10B of Sample 22 were produced in the same manner as Sample 1 except that the thin metal wires had a line width of 4 μm.

<Samples 23 to 28>

The first conductive sheets 10A and the second conductive sheets 10B of Samples 23, 24, 25, 26, 27, and 28 were produced in the same manner as Sample 22 except that the thin metal wires had line pitches of 100, 200, 300, 400, 500, and 600 μm respectively.

<Sample 29>

The first conductive sheet 10A and the second conductive sheet 10B of Sample 29 were produced in the same manner as Sample 1 except that the thin metal wires had a line width of 3 μm.

<Samples 30 to 35>

The first conductive sheets 10A and the second conductive sheets 10B of Samples 30, 31, 32, 33, 34, and 35 were produced in the same manner as Sample 29 except that the thin metal wires had line pitches of 100, 200, 300, 400, 500, and 600 μm respectively.

<Sample 36>

The first conductive sheet 10A and the second conductive sheet 10B of Sample 36 were produced in the same manner as Sample 1 except that the thin metal wires had a line width of 2 μm.

<Samples 37 to 42>

The first conductive sheets 10A and the second conductive sheets 10B of Samples 37, 38, 39, 40, 41, and 42 were produced in the same manner as Sample 36 except that the thin metal wires had line pitches of 100, 200, 300, 400, 500, and 600 μm respectively.

<Sample 43>

The first conductive sheet 10A and the second conductive sheet 10B of Sample 43 were produced in the same manner as Sample 1 except that the thin metal wires had a line width of 1 μm.

<Samples 44 to 49>

The first conductive sheets 10A and the second conductive sheets 10B of Samples 44, 45, 46, 47, 48, and 49 were produced in the same manner as Sample 43 except that the thin metal wires had line pitches of 100, 200, 300, 400, 500, and 600 μm respectively.

(Visibility Evaluation)<
Visual Finding Difficulty of Thin Metal Wires>

In each of Samples 1 to 49, the first conductive sheet 10A was stacked on the second conductive sheet 10B to produce the conductive sheet stack 12. The conductive sheet stack 12 was attached to the display screen 110a of the display device 108 to form the touch panel 100. The touch panel 100 was fixed to a turntable, and the display device 108 was operated to display a white color. Whether a thickened line or a black point was formed or not on the touch panel 100 and whether boundaries between the conductive patterns in the touch panel 100 were visible or not were observed by the naked eye.

The touch panel 100 was evaluated as "Excellent" when the thickened line, the black point, and the conductive pattern boundary were less visible, as "Good" when one of the thickened line, the black point, and the conductive pattern boundary was highly visible, as "Fair" when two of the thickened line, the black point, and the conductive pattern boundary was highly visible, or as "Poor" when all of the thickened line, the black point, and the conductive pattern boundary was highly visible.

<Transmittance>

The transmittance of the conductive sheet stack 12 was measured by a spectrophotometer. The conductive sheet stack 12 was evaluated as "Excellent" when the transmittance was 90% or more, as "Good" when the transmittance was at least 85% but less than 90%, as "Fair" when the transmittance was at least 80% but less than 85%, or as "Poor" when the transmittance was less than 80%.

TABLE 6

| | Line width of thin metal wire (μm) | Pitch of thin metal wire (μm) | Visibility Visual finding difficulty of thin metal wire | Transmittance |
|---|---|---|---|---|
| Sample 1 | 7 | 70 | Good | Poor |
| Sample 2 | 7 | 100 | Good | Poor |
| Sample 3 | 7 | 200 | Good | Poor |
| Sample 4 | 7 | 300 | Excellent | Good |
| Sample 5 | 7 | 400 | Good | Excellent |
| Sample 6 | 7 | 500 | Poor | Good |
| Sample 7 | 7 | 600 | Poor | Good |
| Sample 8 | 6 | 70 | Good | Poor |
| Sample 9 | 6 | 100 | Good | Poor |
| Sample 10 | 6 | 200 | Good | Fair |
| Sample 11 | 6 | 300 | Excellent | Good |
| Sample 12 | 6 | 400 | Good | Excellent |
| Sample 13 | 6 | 500 | Fair | Good |
| Sample 14 | 6 | 600 | Poor | Good |
| Sample 15 | 5 | 70 | Good | Poor |
| Sample 16 | 5 | 100 | Good | Poor |
| Sample 17 | 5 | 200 | Excellent | Good |
| Sample 18 | 5 | 300 | Excellent | Excellent |
| Sample 19 | 5 | 400 | Good | Excellent |
| Sample 20 | 5 | 500 | Fair | Good |
| Sample 21 | 5 | 600 | Poor | Good |
| Sample 22 | 4 | 70 | Good | Poor |
| Sample 23 | 4 | 100 | Good | Poor |
| Sample 24 | 4 | 200 | Excellent | Good |
| Sample 25 | 4 | 300 | Excellent | Excellent |
| Sample 26 | 4 | 400 | Good | Excellent |
| Sample 27 | 4 | 500 | Fair | Good |
| Sample 28 | 4 | 600 | Poor | Good |

TABLE 7

| | Line width of thin metal wire (μm) | Pitch of thin metal wire (μm) | Visibility Visual finding difficulty of thin metal wire | Transmittance |
|---|---|---|---|---|
| Sample 29 | 3 | 70 | Good | Poor |
| Sample 30 | 3 | 100 | Good | Fair |
| Sample 31 | 3 | 200 | Excellent | Good |
| Sample 32 | 3 | 300 | Excellent | Excellent |
| Sample 33 | 3 | 400 | Good | Excellent |
| Sample 34 | 3 | 500 | Fair | Good |
| Sample 35 | 3 | 600 | Poor | Good |
| Sample 36 | 2 | 70 | Good | Fair |
| Sample 37 | 2 | 100 | Good | Good |
| Sample 38 | 2 | 200 | Excellent | Excellent |
| Sample 39 | 2 | 300 | Excellent | Excellent |
| Sample 40 | 2 | 400 | Good | Excellent |
| Sample 41 | 2 | 500 | Fair | Good |
| Sample 42 | 2 | 600 | Poor | Good |
| Sample 43 | 1 | 70 | Good | Good |
| Sample 44 | 1 | 100 | Good | Good |
| Sample 45 | 1 | 200 | Excellent | Excellent |
| Sample 46 | 1 | 300 | Excellent | Excellent |
| Sample 47 | 1 | 400 | Good | Excellent |
| Sample 48 | 1 | 500 | Fair | Good |
| Sample 49 | 1 | 600 | Poor | Good |

As shown in Tables 6 and 7, both of visual finding difficulty of the thin metal wires and transmittance were satisfactory in Samples 4, 5, 11, and 12 (the thin metal wires having a line width of 6 μm or more and 7 μm or less and a line pitch of 300 μm or more and 400 μm or less), Samples 17 to 19, 24 to 26, and 31 to 33 (the thin metal wires having a line width of 3 μm or more and 5 μm or less and a line pitch of 200 μm or more and 400 μm or less), Samples 37 to 40 (the thin metal wires having a line width of 2 μm and a line pitch of 100 μm or more and 400 μm or less), and Samples 43 to 47 (the thin metal wires having a line width of 1 μm and a line pitch of 70 μm or more and 400 μm or less).

Samples 4 and 5 (the thin metal wires having a line width of more than 6 μm but at most 7 μm and a line pitch of 300 μm or more and 400 μm or less) and Samples 10 to 13, 17 to 20, 24 to 27, 31 to 34, 38 to 41, and 45 to 48 (the thin metal wires having a line width of 6 μm or less and a line pitch of 200 μm or more and 500 μm or less) exhibited preferred results.

Samples 4, 5, 11, and 12 (the thin metal wires having a line width of more than 5 μm but at most 7 μm and a line pitch of 300 μm or more and 400 μm or less) and Samples 17 to 19, 24 to 26, 31 to 33, 38 to 40, and 45 to 47 (the thin metal wires having a line width of 5 μm or less and a line pitch of 200 to 400 μm) exhibited particularly preferred results.

It is to be understood that the conductive sheet and the touch panel of the present invention are not limited to the above embodiments, and various changes and modifications may be made therein without departing from the scope of the present invention.

The invention claimed is:

1. A conductive sheet, which is used on a display panel of a display device, comprising a first conductive part disposed closer to an input operation surface and a second conductive part disposed closer to the display panel, wherein
   the first conductive part and the second conductive part overlap with each other,
   the first conductive part contains a plurality of first conductive patterns composed of thin metal wires,
   the first conductive patterns are arranged in one direction and each connected to a plurality of first electrodes,
   the second conductive part contains a plurality of second conductive patterns composed of the thin metal wires,
   the second conductive patterns are arranged in a direction perpendicular to the one direction of the first conductive patterns and each connected to a plurality of second electrodes,
   an occupation area of the second conductive patterns is larger than an occupation area of the first conductive patterns, and
   the thin metal wires have a line width of 6 μm or less and a line pitch of 200 μm or more and 500 μm or less, or alternatively the thin metal wires have a line width of more than 6 μm but at most 7 μm and a line pitch of 300 μm or more and 400 μm or less, wherein
   the second electrodes each contain a combination of a plurality of first lattices,
   the first electrodes each contain a combination of a plurality of second lattices larger than the first lattices,
   the second lattices each have a length component, and
   a length of the length component is a real-number multiple of a side length of the first lattice.

2. The conductive sheet according to claim 1, wherein
   the thin metal wires have a line width of 5 μm or less and a line pitch of 200 μm or more and 400 μm or less, or alternatively the thin metal wires have a line width of more than 5 μm but at most 7 μm and a line pitch of 300 μm or more and 400 μm or less.

3. The conductive sheet according to claim 1, further comprising a substrate, wherein
   the first conductive part and the second conductive part are arranged facing each other with the substrate interposed therebetween, and the substrate has a thickness of 75 μm or more and 350 μm or less.

4. The conductive sheet according to claim 1, wherein the conductive sheet satisfies the condition of $1<A2/A1\leq20$, where the first conductive patterns have an occupation area A1 and the second conductive patterns have an occupation area A2.

5. The conductive sheet according to claim 1, wherein the conductive sheet satisfies the condition of $1<A2/A1\leq10$, where the first conductive patterns have an occupation area A1 and the second conductive patterns have an occupation area A2.

6. The conductive sheet according to claim 1, wherein the conductive sheet satisfies the condition of $2 A2/A1\geq10$, where the first conductive patterns have an occupation area A1 and the second conductive patterns have an occupation area A2.

7. The conductive sheet according to claim 1, wherein
   the first conductive part and/or the second conductive part contain auxiliary electrodes composed of the thin metal wires,
   the auxiliary electrodes are disposed between the first electrodes and the second electrodes,
   the second conductive part contains additional auxiliary electrodes composed of the thin metal wires, and
   the additional auxiliary electrodes are disposed in positions corresponding to the first electrodes.

8. The conductive sheet according to claim 7, wherein the occupation area of the additional auxiliary electrodes is ½ or less of the occupation area of the second electrodes.

9. The conductive sheet according to claim 7, wherein the additional auxiliary electrodes, which are composed of the thin metal wires and disposed in the positions corresponding to the first electrodes, are combined with the first electrodes in the first conductive part to form lattice patterns.

10. The conductive sheet according to claim 7, wherein the thin metal wires are arranged into a mesh shape in the first electrodes.

11. The conductive sheet according to claim 7, wherein
    the thin metal wires in the additional auxiliary electrodes, which are disposed in the positions corresponding to the first electrodes, have a straight line shape.

12. The conductive sheet according to claim 11, wherein
    the second electrodes each contain a combination of a plurality of the first lattices, and
    a length of the thin metal wire having the straight line shape in the additional auxiliary electrodes is a real-number multiple of a side length of the first lattice.

13. The conductive sheet according to claim 7, wherein
    the thin metal wires in the additional auxiliary electrodes, which are disposed in the positions corresponding to the first electrodes, have a mesh shape.

14. The conductive sheet according to claim 13, wherein
    the second electrodes each contain a combination of a plurality of the first lattices,
    the additional auxiliary electrodes each contain a combination of a plurality of the second lattices larger than the first lattices,
    the second lattices each have a length component, and
    a length of the length component is a real-number multiple of a side length of the first lattice.

15. The conductive sheet according to claim 7, further comprising a substrate, wherein
    the first conductive part and the second conductive part are arranged facing each other with the substrate interposed therebetween,
    the first electrodes and the second electrodes each have a mesh pattern, auxiliary patterns of the additional auxiliary electrodes composed of the thin metal wires are disposed between the second electrodes in the positions corresponding to the first electrodes, the second electrodes are arranged adjacent to the first electrodes as viewed from above, the first electrodes overlap with the auxiliary patterns to form combined patterns, and the combined patterns each contain a combination of mesh shapes.

16. The conductive sheet according to claim 15, wherein the second electrodes each contain a first large lattice containing a combination of a plurality of first small lattices, the first electrodes each contain a second large lattice containing a combination of a plurality of second small lattices larger than the first small lattices, the first large lattices in the combined patterns are arranged adjacent to the second large lattices, the first large lattices overlap with the auxiliary patterns to form the combined patterns, and the combined patterns each contain a combination of two or more first small lattices.

17. The conductive sheet according to claim 1, further comprising a substrate, wherein the first conductive part and the second conductive part are arranged facing each other with the substrate interposed therebetween.

18. The conductive sheet according to claim 17, wherein the first conductive part is formed on one main surface of the substrate, and the second conductive part is formed on another main surface of the substrate.

19. A touch panel comprising a conductive sheet, which is used on a display panel of a display device, wherein the conductive sheet has a first conductive part disposed closer to an input operation surface and a second conductive part disposed closer to the display panel, the first conductive part and the second conductive part overlap with each other, the first conductive part contains a plurality of first conductive patterns composed of thin metal wires, the first conductive patterns are arranged in one direction and each contain a plurality of first electrodes connected, the second conductive part contains a plurality of second conductive patterns composed of the thin metal wires, the second conductive patterns are arranged in a direction perpendicular to the one direction of the first conductive patterns and each contain a plurality of second electrodes connected, the occupation area of the second conductive patterns is larger than the occupation area of the first conductive patterns, and the thin metal wires have a line width of 6 μm or less and a line pitch of 200 μm or more and 500 μm or less, or alternatively the thin metal wires have a line width of more than 6 μm but at most 7 μm and a line pitch of 300 μm or more and 400 μm or less, wherein the second electrodes each contain a combination of a plurality of first lattices, the first electrodes each contain a combination of a plurality of second lattices larger than the first lattices, the second lattices each have a length component, and a length of the length component is a real-number multiple, of a side length of the first lattice.

* * * * *